(12) United States Patent
Strom et al.

(10) Patent No.: US 9,014,497 B2
(45) Date of Patent: Apr. 21, 2015

(54) TILE ENCODING AND DECODING

(75) Inventors: Jacob Strom, Stockholm (SE); Per Wennersten, Arsta (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 88 days.

(21) Appl. No.: 13/994,070

(22) PCT Filed: Dec. 14, 2010

(86) PCT No.: PCT/SE2010/051379
§ 371 (c)(1),
(2), (4) Date: Jun. 13, 2013

(87) PCT Pub. No.: WO2012/082028
PCT Pub. Date: Jun. 21, 2012

(65) Prior Publication Data
US 2013/0278617 A1     Oct. 24, 2013

(51) Int. Cl.
*G06K 9/46*    (2006.01)
*G06T 9/00*    (2006.01)
*H04N 19/176*    (2014.01)
(Continued)

(52) U.S. Cl.
CPC . *G06T 9/005* (2013.01); *G06T 9/00* (2013.01); *H04N 19/176* (2014.11); *H04N 19/91* (2014.11); *H04N 19/42* (2014.11); *H04N 19/436* (2014.11); *H04N 19/69* (2014.11)

(58) Field of Classification Search
USPC ................ 382/235, 238, 239, 243, 282, 284; 358/539, 426.13, 453, 470
See application file for complete search history.

(56) References Cited

U.S. PATENT DOCUMENTS

| 5,392,396 A | 2/1995 | MacInnis |
| 5,778,191 A | 7/1998 | Levine et al. |

(Continued)

FOREIGN PATENT DOCUMENTS

| JP | 6-215117 A | 8/1994 |
| JP | 9-64753 A | 3/1997 |

(Continued)

OTHER PUBLICATIONS

Gao et al. "Error-Resillent H.264/AVC Video Transmission Using Two-Way Decodable Variable Length Data Block" IEEE Transactions of Circuits and Systems for Video Technology, vol. 20, No. 3, 2010, pp. 340-350.

(Continued)

*Primary Examiner* — Nancy Bitar
(74) *Attorney, Agent, or Firm* — Rothwell, Figg, Ernst & Manbeck, P.C.

(57) ABSTRACT

A tile of pixels is encoded by variable length encoding at least a first block of pixels into a first sequence of symbols and a second block of pixels into a second sequence of symbols. The symbols of the first and second sequences are co-organized into a combined sequence of symbols in which the symbols of the first sequence are readable in a first reading direction and at least a portion of the symbols in the second sequence are readable in a second, opposite reading direction. The encoding of the tile to form one or more combined sequences significantly reduces the bandwidth requirements when writing the tile to a pixel value buffer. The co-organization of the first and second sequences enables parallel reading and decoding of the first and second sequences from the pixel value buffer, thereby reducing any decoding latency.

36 Claims, 6 Drawing Sheets

(51) Int. Cl.
*H04N 19/91* (2014.01)
*H04N 19/42* (2014.01)
*H04N 19/436* (2014.01)
*H04N 19/69* (2014.01)

(56) References Cited

U.S. PATENT DOCUMENTS

| | | | |
|---|---|---|---|
| 5,852,469 A | 12/1998 | Nagai et al. | |
| 6,256,064 B1 | 7/2001 | Chujoh et al. | |
| 7,433,825 B1 | 10/2008 | Sperschneider et al. | |
| 7,785,098 B1 * | 8/2010 | Appleby et al. | 425/470 |
| 8,160,056 B2 * | 4/2012 | Van der Merwe et al. | 370/351 |
| 8,291,069 B1 * | 10/2012 | Phillips | 709/224 |
| 8,351,722 B2 | 1/2013 | Okuda et al. | |
| 8,374,383 B2 * | 2/2013 | Long et al. | 382/100 |
| 8,374,498 B2 * | 2/2013 | Pastore | 396/199 |
| 8,502,864 B1 * | 8/2013 | Watkins | 348/52 |
| 8,898,633 B2 * | 11/2014 | Bryant et al. | 717/120 |
| 2007/0076800 A1 | 4/2007 | Shukla et al. | |

FOREIGN PATENT DOCUMENTS

| | | |
|---|---|---|
| JP | 9-182073 A | 7/1997 |
| JP | 2010-154225 A | 7/2010 |

OTHER PUBLICATIONS

Tu et al. "Joint Source-Channel Coding-Decoding by Combining RVLC and VLC CCSDS IDC coefficients" Networking, Sensing and Control (ICNSC), 2010 International Conference, pp. 49-52.

Office Action dated Dec. 22, 2014, issued in Japanese Patent Application No. 2013-544422, 6 pages.

* cited by examiner

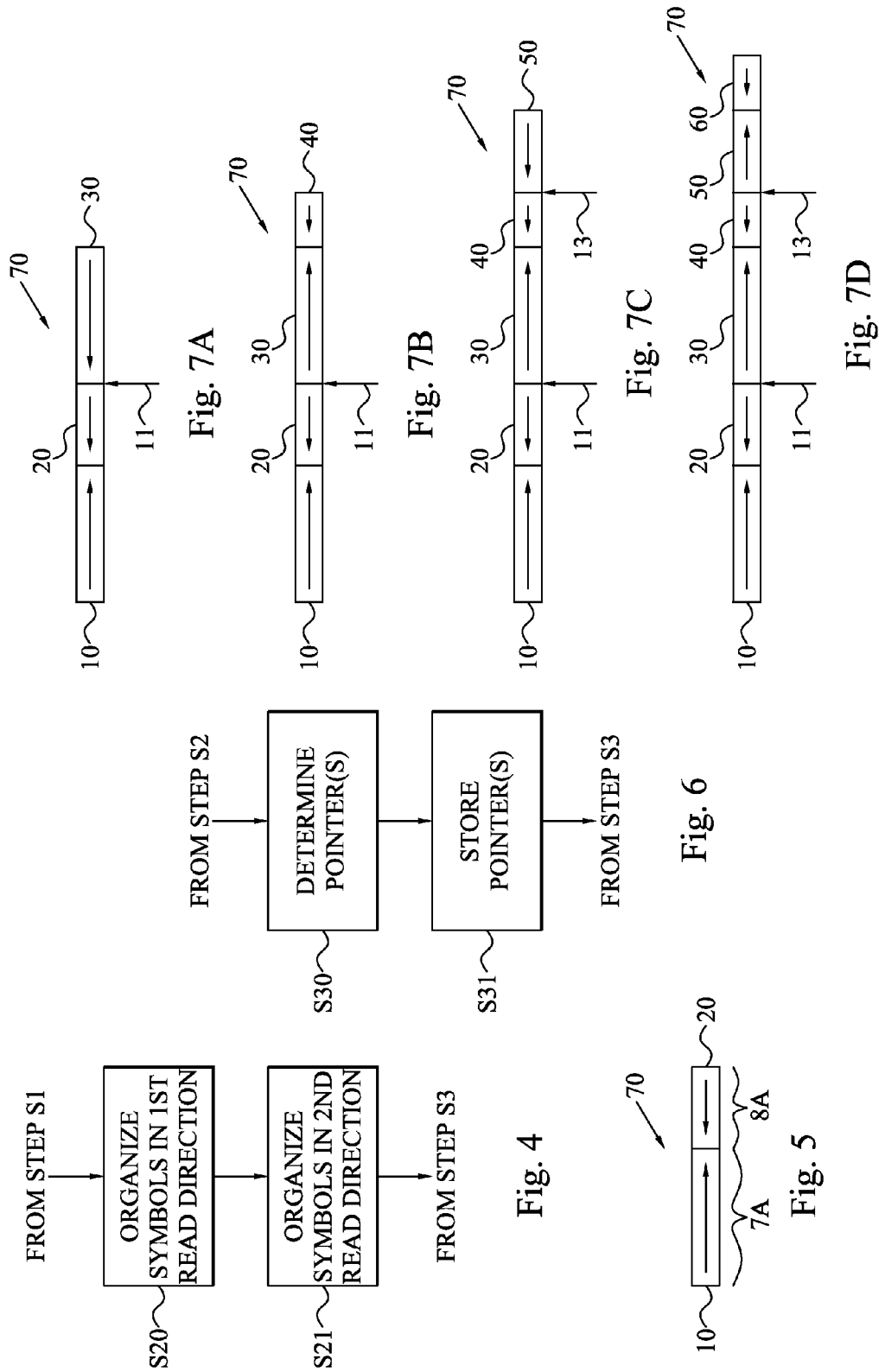

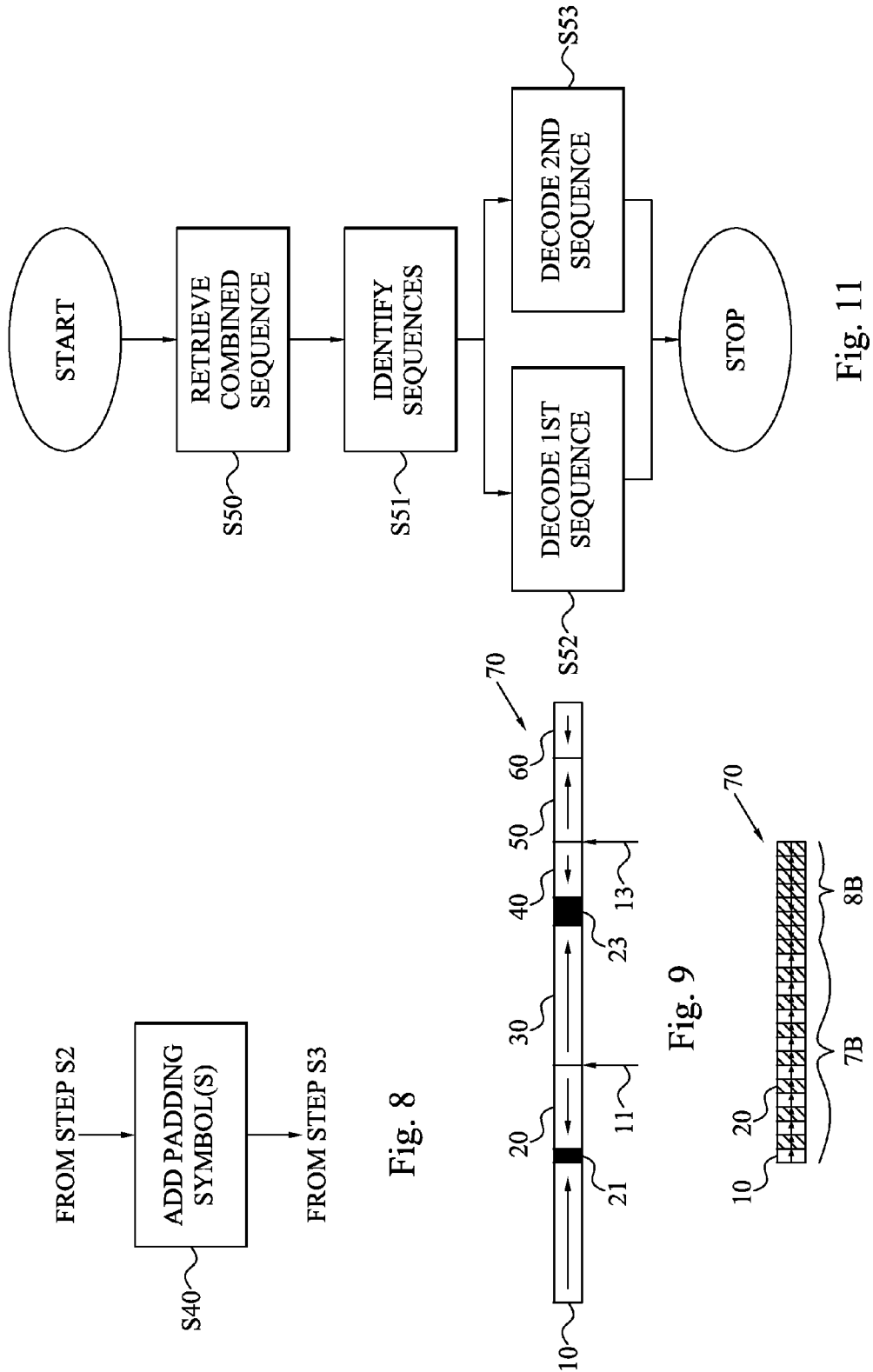

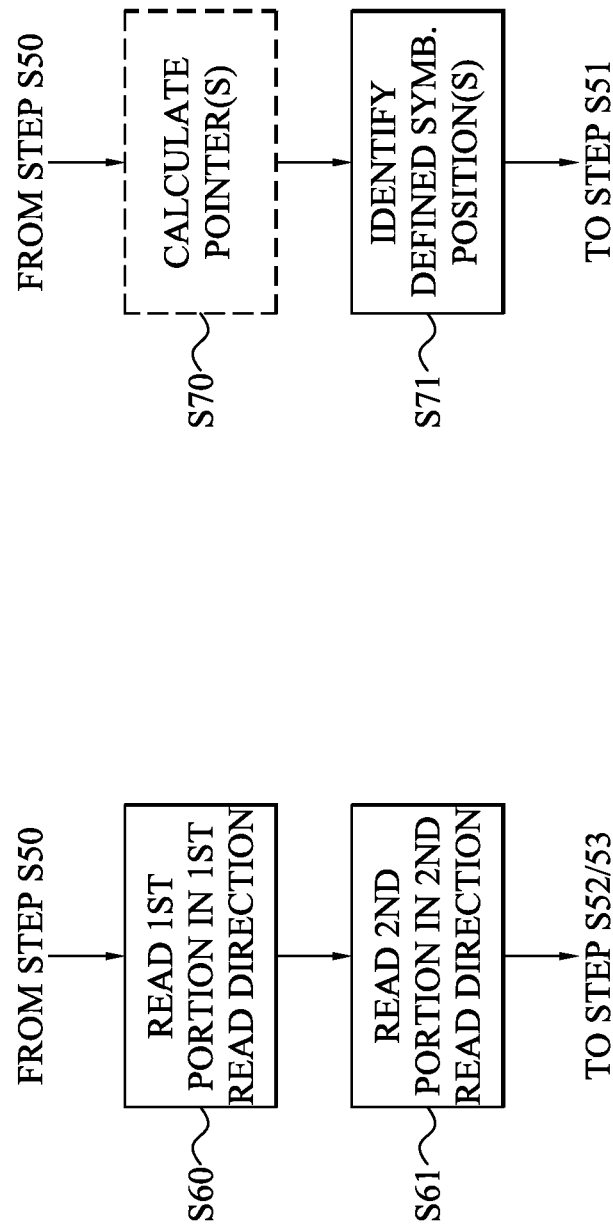

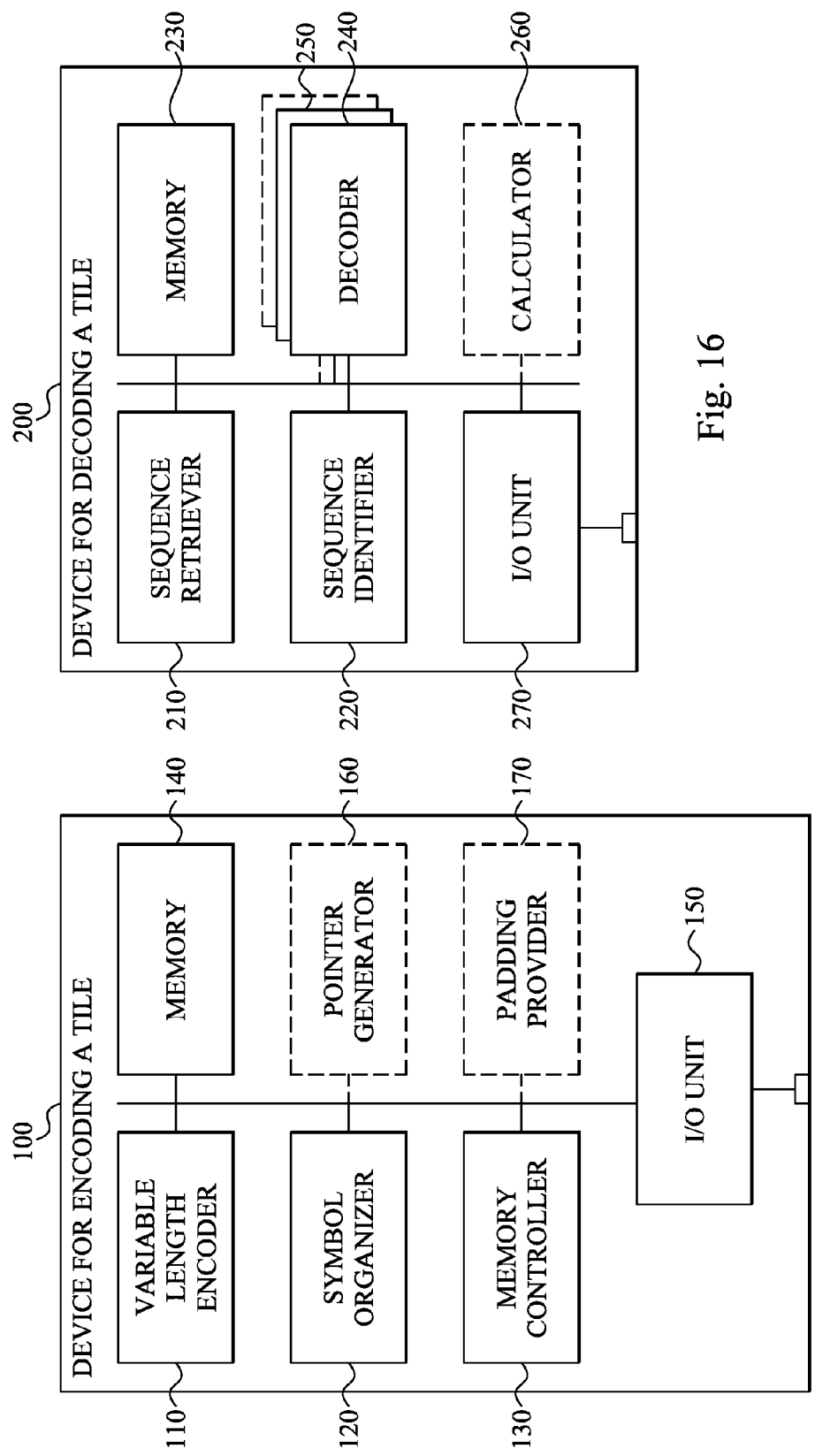

TILE ENCODING AND DECODING

CROSS REFERENCE TO RELATED APPLICATION(S)

This application is a 35 U.S.C. §371 National Phase Entry Application from PCT/SE2010/051379, filed Dec. 14, 2010, designating the United States, the disclosure of which is incorporated herein in its entirety by reference.

TECHNICAL FIELD

The present invention generally relates to image processing, and in particular to encoding and decoding of tiles.

BACKGROUND

One of the bandwidth-consuming tasks in a computer graphics system is updating buffers, and in particular the color buffer. The color buffer contains the data that is finally going to be displayed, i.e. the output pixels. In a traditional architecture the color buffer is updated triangle by triangle. First the first triangle is rasterized, and the corresponding pixels of the color buffer are updated. Then the second triangle is rasterized, writing to its pixels in the color buffer, potentially overlapping with those of the first triangle. This means that each pixel in the color buffer can be written to several times. A typical application will overwrite every pixel in the color buffer perhaps three to ten times on average. This is known as having an overdraw of 3 to 10 within the technical field. This means that the write bandwidth for the color buffer will be between three and ten times as large as if each pixel was only written once.

One way to decrease the bandwidth requirements of the color buffer is to use what is known as a tiled architecture. Instead of rasterizing the scene triangle by triangle, the color buffer is divided into non-overlapping tiles. Then the scene is rendered tile by tile. For the first tile, only the triangles overlapping with the first tile are used for rasterization. The tile size is made small enough so that the entire tile can fit on-chip on the graphical processing unit (GPU). Hence no external memory accesses to the color buffer are needed during the rendering of the triangles of the tile. When all the triangles in the tile have been rasterized, the tile is sent to the color buffer memory and the next tile is processed. Note that in a tiled architecture, each pixel in the color buffer is only written once to external memory. This means that a tiled architecture can often decrease the write bandwidth for the color buffer with a factor of 3-10.

Another technique to lower color buffer bandwidth is called buffer compression. This means that blocks of buffer data are stored in memory in compressed form. The scene is still processed triangle-by-triangle, but before sending a block of pixels to the color buffer memory, the pixels are compressed. A few bits called size bits stored or cached in the GPU are used to keep track of how well the data was compressed, for instance compressed down to a bit length corresponding to 25%, 50% or 75% of the original bit length or not compressed at all. When a subsequent triangle wants to write to the same block of pixels, the size bits are used to know how much data should be read. The block is decompressed, the new triangle overwrites some of the pixels in the block, and the block is then again compressed and stored. Hasselgren and Akenine-Möller, 2006, Efficient Depth Buffer Compression, In Graphics Hardware, 103-110 and Rasmusson, Hasselgren and Akenine-Möller, 2007, Exact and Error-bounded Approximate Color Buffer Compression and Decompression, In Graphics Hardware, 41-48 give good overviews of color buffer compression and depth buffer compression respectively.

A limitation with the tiled architecture is that, although each pixel is only written once, this is still quite expensive. Furthermore, the display controller will have to read each pixel to output it to the display. This means that each pixel will have to be read from the color buffer and written to the color buffer at least once in uncompressed form, which is expensive.

A problem with the color buffer compression solution is that, even if it is possible to achieve a compression factor of 50%, it is still too much bandwidth. With an overdraw of, for instance, 6, every pixel is still written six times on average. A compression ratio of 50% will bring down the effective bandwidth to 3 times the number of pixels, but that is still more than for the tiled architecture.

There is therefore a need for a technique that can efficiently handle pixel value buffers in connection with computer graphics system.

SUMMARY

It is a general objective of the embodiments to provide a technique for efficiently handling pixel value buffers in connection with graphics systems.

This and other objectives are met by embodiments as disclosed herein.

An aspect of the embodiments defines a method of encoding a tile of pixels each having a respective pixel value. The method comprises variable length encoding at least a first block of pixels into a first sequence of symbols and a second block of pixels into a second sequence of symbols. The first and second blocks constitute different subsets of the tile. The first sequence is an encoded representation of the pixel values of the pixels in the first block and the second sequence is a corresponding encoded representation of the pixel values in the second block.

The symbols of the first and second sequences are co-organized into a combined sequence of symbols. The symbols of the first sequence are then readable in a first reading direction in the combined sequence. The combined sequence is further generated so that at least a portion of the symbols in the second sequence are readable in a second, opposite reading direction. The generated combined sequence is then stored in a memory.

The encoding of blocks of a tile will reduce the bandwidth requirements when writing the tile to a pixel value buffer. The co-organization of the symbols in the combined sequence additionally facilitates an easy identification of the symbols belonging to respective sequence of the at least first and second sequences. This is possible even though the sequences have been obtained from variable length encoding, potentially resulting in different symbol lengths of the sequences. This means that decoding of the first and second sequences from the combined sequence can be conducted in parallel thereby reducing any decoding latency.

Another aspect of the embodiments relates to a device for encoding a tile. The device comprises a variable length encoder configured to variable length encode at least the first and second blocks into the first and second sequences of symbols. A symbol organizer is configured to co-organize the symbols of the first and second sequences into the combined sequence so that the symbols of the first sequence are readable in the first reading direction from the combined sequence and at least a portion of the symbols of the second sequence are readable in the second, opposite reading direction. A memory controller of the device is configured to store the generated combined sequence in a memory.

A further aspect of the embodiments defines a method of decoding a tile. The method comprises retrieving the combined sequence of symbols from a buffer memory. The first sequence of symbols is identified by reading a first portion of the retrieved combined sequence in the first reading direction starting from a first defined symbol position in the combined sequence. The second sequence of symbols is correspondingly identified by reading a second portion of the retrieved combined sequence in the second, opposite reading direction starting from a second defined symbol position in the combined sequence. The identified first sequence is then decoded to get decoded representations of the pixel values of the pixels in the first block. The second sequence is correspondingly decoded to get decoded representations of the pixel values in the second block of the tile.

Yet another aspect of the embodiments relates to a device for decoding a tile. The device comprises a sequence retriever configured to retrieve the combined sequence from a buffer memory. A sequence identifier is implemented to identify the first sequence by reading the first portion of the retrieved combined sequence in the first reading direction. The sequence identifier also reads the second portion of the combined sequence in the second, opposite reading direction in order to identify the second sequence from the combined sequence. A first decoder then decodes the first sequence to get decoded representations of the pixel values in the first block of the tile and a second decoder decodes the second sequence to get decoded representations of the pixel values in the second block.

BRIEF DESCRIPTION OF THE DRAWINGS

The invention, together with further objects and advantages thereof, may best be understood by making reference to the following description taken together with the accompanying drawings, in which:

FIG. 4 is a flow diagram illustrating an embodiment of the co-organizing step in FIG. 1;

FIG. 5 schematically illustrates a combined sequence of symbols according to an embodiment;

FIG. 6 is a flow diagram illustrating additional, optional steps of the method in FIG. 1;

FIGS. 7A to 7D schematically illustrate combined sequences of symbols according to different embodiments;

FIG. 8 is a flow diagram illustrating an additional, optional step of the method in FIG. 1;

FIG. 9 is a schematic illustration of a combined sequence of symbols comprising padding symbols according to an embodiment;

FIG. 10 schematically illustrates a combined sequence of symbols according to an embodiment;

FIG. 11 is a flow diagram illustrating a method of decoding a tile according to an embodiment;

FIG. 12 is a flow diagram illustrating an embodiment of the sequence identifying step in FIG. 11;

FIG. 13 is a flow diagram illustrating additional, optional steps of the method in FIG. 11;

FIG. 15 is a schematic block diagram of a device for encoding a tile according to an embodiment; and FIG. 16 is a schematic block diagram of a device for decoding a tile according to an embodiment.

DETAILED DESCRIPTION

Figure 3:
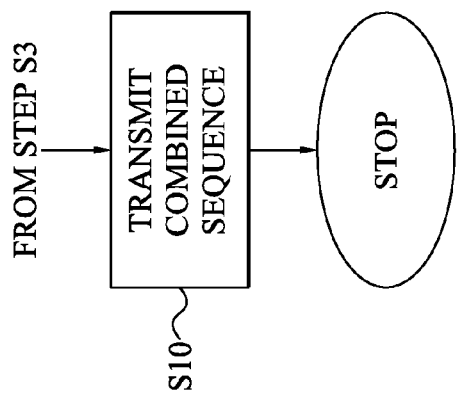
FIG. 3 is a flow diagram illustrating an additional, optional step of the method in FIG. 1.

Throughout the drawings, the same reference numbers are used for similar or corresponding elements.

The embodiments generally relate to image processing and in particular to encoding and decoding of a tile of pixels constituting at least a portion of a pixel value buffer. The embodiments thereby combine the prior art techniques for buffer compression with tiled architecture to even further reduce the write bandwidth when writing to and updating a pixel value buffer in a buffer memory. The encoding and decoding of the tile are further conducted in a particular way that allows parallel decoding of different parts of the encoded tile and thereby enable reduction of the decoding time.

According to the embodiments, a tile of pixels represents at least a portion of the pixel value buffer. Hence, the pixel value buffer is divided into one or, typically multiple, i.e. at least two, non-overlapping portions that are denoted tiles in the art. It could be possible, in particular for very small pixel value buffers, that a single tile occupies the whole pixel value buffer. However, in most practical implementations the pixel value buffer is regarded as being divided into separate non-overlapping tiles.

However, encoding a whole tile is generally not feasible due to long encoding and decoding times and reduced encoding efficiency. Hence, there is desire to divide a tile into multiple blocks of pixels, where the size of such a block in terms of the number of pixels is selected to be efficiently handled from encoding and decoding point of view.

However, the division of a tile into multiple smaller blocks with regard to encoding and decoding efficiency introduces problems with data transfer. The resulting symbol size or length of an encoded representation of a block is generally not well adapted for efficient transfer over data buses. Thus, the data buses of the graphics system are generally designed to achieve efficient burst transfer for symbol lengths that are longer than what is desired from encoding and decoding point of view.

The embodiments solve these conflicting desires by co-organizing sequences of symbols obtained by encoding multiple blocks into a combined sequence that can be efficiently transferred over data buses but where the individual sequences of symbols have a size that is well adapted to the encoding and decoding requirements.

The co-organization of the sequences of symbols into the combined sequence is performed according to the embodiments in a way that enables parallel decoding of individual sequences of symbols even when variable length encoding schemes are employed to encode the blocks.

The variable length encoding implies that the sequences of symbols do not have a single fixed symbol length but rather can adopt various symbol lengths. Organizing the sequences of symbols next to each other in the combined sequence will prevent random access to the sequence of symbols of a particular block at the decoding side since the decoder has no idea of where the sequence of symbols starts and ends in the combined sequence. Hence, the only possibility of identifying the respective start symbol and end symbol for each sequence of symbols in the combined sequence is then to parse through and decode the combined sequence starting from the most significant symbol and continuing towards the least significant symbol. However, such an approach implies that no parallel decoding of individual sequences of symbols is possible and only a single decoder can operate per combined sequence.

The embodiments solve this problem through the particular co-organization of the sequences of symbols in the combined sequence to allow multiple decoders to operate in parallel on the combined sequence and thereby significantly reduce the decoding latency as compared to a single sequential decoding line.

According to the embodiments, each pixel has a respective pixel value. Various such pixel values are used in the art, depending on the particular application. A typical example of such pixel value is a color value, and more preferably a multi-component color value. In the latter case, the pixel color consists of multiple color components. A typical example of such a color is a red, green, blue (RGB) color having three color components. Other multi-component colors, such as YUV, YCoCg or YCrCb, are also known in the art and can be used according to the embodiments.

Another example of pixel value that can be used according to the embodiments is a depth value or so-called Z value. This feature represents the depth or distance to the eye for the particular pixel and controls which pixels that will actually be displayed during rendering.

The tile could then constitute at least a portion of a color buffer or a depth buffer.

Another example of a pixel value buffer, besides color and depth buffer, to which the embodiments can be applied, is a so-called stencil buffer. The stencil buffer can be used to limit the area of rendering, also denoted stenciling in the art. The stencil buffer can also be used in connection with the depth buffer in the rendering pipeline. For instance, stencil values can be automatically updated, i.e. increased or decreased, for every pixel that fails or passes the depth test. The stencil buffers find applications in achieving various effects, such as shadows, outline drawing or highlighting of intersections between complex primitives. In such a case, the tile could constitute at least a portion of a stencil buffer and the pixel value is a stencil value of the stencil buffer.

Actually, the pixel value could be any property that is desired to be assigned on pixel basis and where pixels are grouped into tiles. The usage of programmable shaders within graphics systems enables creation and usage of various pixel value buffers and the embodiments can also be applied to such pixel value buffers. For instance, in deferred rendering, normals are written to buffers so that the pixels each then represents a normal (X, Y, Z coordinate, or if unit normals are employed only two coordinates are needed). Also such applications can benefit from the embodiments.

Encoding

Figure 1:
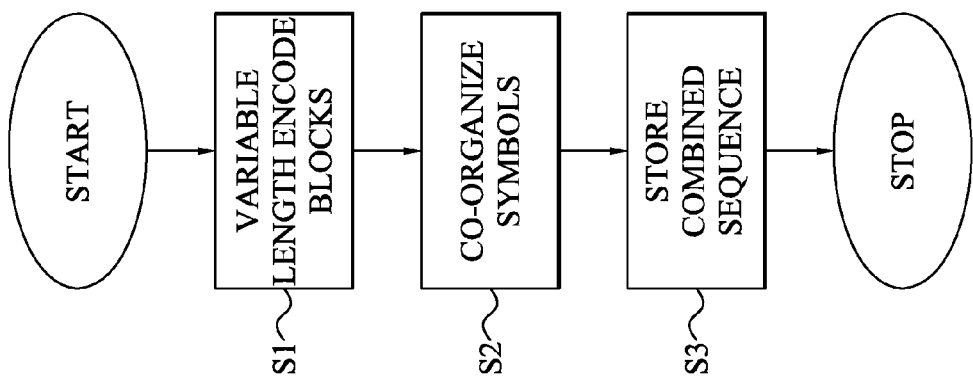
FIG. 1 is a flow diagram illustrating a method of encoding a tile according to an embodiment.

FIG. 1 is a flow diagram illustrating an embodiment of a method of encoding a tile of pixels, where each pixel has a respective pixel value. The method starts in step S1, where at least a first block of pixels and a second block of pixels are variable length encoded. The first block constitutes a first subset of the tile and the second block correspondingly constitutes a second, different, i.e. non-overlapping, subset of the tile. The variable length encoding of step S1 generates a first sequence of symbols as encoded representation of the pixel values of the pixels in the first block. Step S1 also generates a second sequence of symbols as encoded representation of the pixel values of the pixels in the second block. The first and second sequence of symbols can be according to any of the traditionally employed symbol alphabets within data encoding. For instance, the alphabet of symbols could be a binary alphabet. In such a case the symbols can be $0_{bin}$ or $1_{bin}$. Other alphabets of symbols that can be used include hexadecimal symbols, i.e. $0\text{-}9_{hex}$ and $A\text{-}F_{hex}$, decimal symbols, i.e. $0\text{-}9_{dec}$. In a preferred application, a binary alphabet with a sequence of bits is used as an illustrative embodiment of symbol alphabet. A symbol as used herein does not represent a VLC symbol, i.e. a variable length coding symbol, which is sometimes employed to denote particular events, such as end of block.

The variable length encoding can be conducted according to any variable length encoding scheme traditionally employed for encoding color or depth buffer data or other pixel value buffers. However, an important difference as compared to the traditional usage of these variable length encoding schemes is that they now will operate on blocks of a tile instead of the complete pixel value buffer. Thus, the embodiments are based on a combination of a tiled architecture and buffer encoding or compression. Examples of suitable variable length encoding schemes that can be employed according to the embodiments are disclosed in Hasselgren and Akenine-Möller, 2006, Efficient Depth Buffer Compression, In Graphics Hardware, 103-110, Rasmusson, Hasselgren and Akenine-Möller, 2007, Exact and Error-bounded Approximate Color Buffer Compression and Decompression, In Graphics Hardware, 41-48, WO 2009/092455, WO 2009/092454 and WO 2009/093947, the teaching of which with regard to variable length encoding schemes is hereby incorporated by reference. The embodiments are, however, not limited to any particular variable length encoding scheme but can instead be applied to and used in connection with any known such variable length encoding scheme that can encodes a block of pixels having pixel values into a sequence of symbols.

Figure 2:
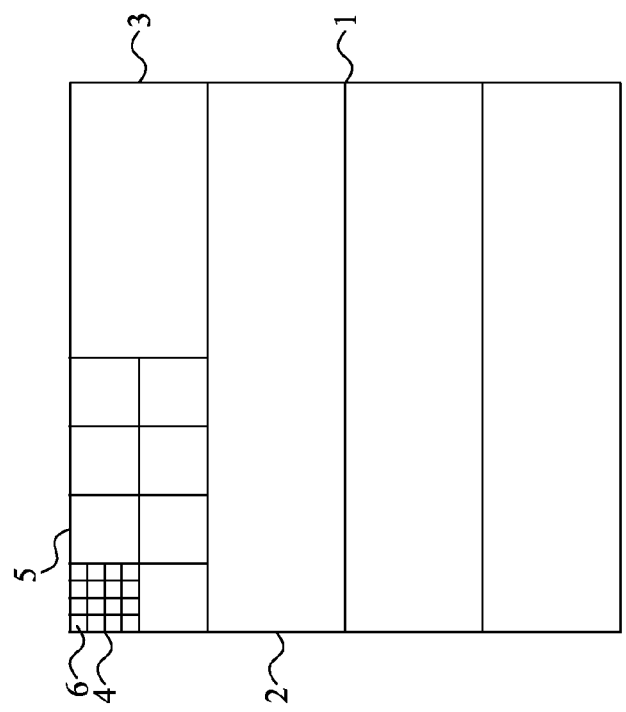
FIG. 2 schematically illustrates a tile and the division of the tile into smaller units according to an embodiment.

FIG. 2 is a schematic illustration of a tile 1 and shows an example of how the tile 1 can be divided into smaller units of pixels 6. The tile 1 could, in a non-limiting but illustrative example, have a size of 32×32 pixels. In such a case, the tile 1 can be divided into four vertical slices 2 of, for instance, 32×8 pixels. In an optional approach, a slice 2 is in turn divided into two chunks 3 of, for instance, 16×8 pixels. The chunk 3 then preferably has a size in terms of the number of pixels 6 that produces a sequence of symbols as encoded representation of the chunk 3 having, on average, a symbol length that enables efficient burst transfer over a data bus. However, even though the symbol length of the encoded representation of the pixels 6 in a chunk 3 could be adapted to efficient burst transfer, the resulting relative long symbol length is not optimal from decoder latency point of view. According to the embodiments, a chunk 3 could therefore be regarded as divided into multiple blocks 4, 5 of pixels 6. In an example, such a block 4, 5 could comprise 4×4 pixels, resulting in eight blocks 4, 5 per chunk 3.

If the decoding can be conducted at a rate of one clock cycle per pixel 6, encoding and decoding a slice 2 would amount, in this example, to a latency of 32×8=256 clock cycles. However, it is not unlikely that only up to 64 clock cycles are available for decoding. A slice 2 could therefore be too large in terms of achieving an efficient decoding. A block 4, 5 of 4×4=16 pixels on the other hand would, in this example, merely need 16 clock cycles for decoding. However, the symbol length of an encoded representation of a block 4, 5 is generally too small for efficient burst transfer. In fact even an uncompressed sequence of a block 4, 5 would result in 4×4×3×8=384 symbols or bits, if each pixel is associated with a RGB color value with 8 bits per color component. This is, though, already too small for efficient burst sizes, which typically may be able to transfer 512 bits in four cycles. If the variable length encoding additionally could result in a compression of, for instance, ⅙, the resulting bit length would be merely 64 bits. This is far too small for efficient burst transfer.

However, a chunk 3 of, for instance, eight blocks 4, 5 would result in a total bit length of 8×384=3072 bits, if uncompressed. If the compression would be ⅙ on average, the total bit length would be 512 bits, which is optimized for burst transfer in the present example. Hence, a tile 1 is advantageously divided into multiple smaller blocks 4, 5 which are individually variable length encoded but are handled together in chunks 3 of at least two blocks 4, 5 when transferring over data buses.

A next step S2 of the method in FIG. 1 co-organizes the symbols in the first sequence and the symbols in the second sequence obtained from the variable length encoding step S1. The symbols are combined into a combined sequence of symbols in a particular way in order to facilitate easy reading of the symbols belonging to the first sequence and the second sequence, respectively. Thus, the symbols of the first sequence are readable in a first or default reading direction from the combined sequence. However, at least a portion of the symbols of the second sequence are readable in a second, opposite reading direction from the combined sequence. This particular co-organization of symbols enables a parallel reading of the respective symbols belonging to first or second sequence and thereby enables parallel decoding of the first sequence and the second sequence. The parallel reading and decoding is possible even though the first and second sequences result from a variable length encoding. Thus, the reading and decoding in parallel is possible even without prior knowledge of the respective lengths of the first sequence and the second sequence.

A next step S3 stores the combined sequence in a memory. The memory is typically a so-called on-chip memory and particular an on-chip memory of a graphical processing unit. In such a case, the method of steps S1-S3 can operate on data stored on the on-chip memory and no external and time-consuming memory fetches to external memories are needed in order to generate the combined sequence of symbols.

The method of steps S1 to S3 is performed together for multiple blocks, such as the blocks of the previously chunk of the tile. Once a next chunk of multiple blocks is to be processed, the operation of steps S1-S3 is conducted once more for the multiple blocks of that chunk. It could even be possible, depending on the particular implementation, to process at least two chunks at least partly in parallel. In either case, the loop of steps S1 to S3 are preferably performed sufficient times, either in parallel or serially, in order to encode the complete tile. Depending on the size of the tile this implies that the loop of steps S1 to S3 could be conducted once or, typically, multiple times until all blocks of the tile are encoded.

FIG. 3 is a flow diagram illustrating an additional step of the method in FIG. 1. The method continues from step S3 of FIG. 1. A next step S10 transmits the combined sequence from the memory in the graphical processing unit to a buffer memory in or connected to a display unit. The transmission of the combined sequence can then be conducted in a burst-transfer-efficient way by combining the sequences of symbols obtained from multiple blocks, where one such sequence of symbols would typically have a too small size for efficient burst transfer.

The tiled approach of the embodiments implies that each pixel in the buffer memory only needs to be written once, thereby decreasing the bandwidth consumption. Additionally, the variable length encoding of blocks of pixels decreases this bandwidth consumption even further since it is possible to transfer encoded and thereby compressed pixel value data to the buffer memory.

Various implementation embodiments will now be described in further detail.

FIG. 4 is a flow diagram illustrating a particular embodiment of the co-organizing step in FIG. 1. The method continues from step S1 in FIG. 1. A next step S20 organizes the symbols of the first sequence in the first reading direction in a first portion of the combined sequence. Step S21 organizes the symbols of the second sequence in the combined sequence. These symbols are organized in the second, opposite reading direction in a second, following portion of the combined sequence.

FIG. 5 illustrates this embodiment in more detail. The combined sequence 70 comprises a first portion 7A with the symbols of the first sequence 10 and a second, following portion 8A. This means that the most significant symbol of the combined sequence 70 is found to the left in FIG. 5 and typically coincides with the most significant symbol of the first sequence 10. The second portion 8A follows after the first portion 7A according to the first reading direction. In clear contrast to the first sequence 10, the symbols in the second sequence 20 are organized in the second, opposite reading direction. The respective reading directions are marked by arrows in FIG. 5. The usage of a second, opposite reading direction for the second sequence 20 means that the most significant symbol of the second sequence will be the least significant symbol of the combined sequence 70.

The organization of the symbols in the first sequence 10 and the second sequence 20 in opposite reading directions as illustrated in FIG. 5 enables a parallel reading and decoding of both sequences 10, 20. Thus, the symbols of the first sequence 10 are read by starting with the most significant symbol of the combined sequence 70 and continuing towards the least significant symbol of the combined sequence 70 but stopping once the end of the first sequence 10 is reached. The symbols in the second sequence 20 are instead, in this embodiment, read starting from the least significant symbol of the combined sequence 70 and continuing towards the most significant symbol of the combined sequence 70 and stopping at the end of the second sequence 20. Hence, no information of respective symbol lengths of the first and second sequences 10, 20 are needed in order to find respective start positions for the two sequences 10, 20 in the combined sequence 70.

This concept of utilizing two opposite reading directions in the combined sequence can also be applied to a case when more than two blocks are variable length encoded and the resulting sequences of symbols are co-organized into a combined sequence.

In such a case, N blocks of pixels constituting respective subsets or portions of the tile are variable length encoded to form N sequences of symbols as encoded representations of the pixel values in the N blocks. The parameter N is then an integer equal to or larger than three. The symbols of the N sequences are then co-organized into the combined sequence.

In an embodiment, the co-organization of the symbols into the combined sequence is conducted so that the symbols in a first sequence of the N sequences are readable in the first reading direction and the symbols of the last sequence, i.e. sequence number N, of the N sequences are readable in the second, opposite reading direction. The symbols of the remaining N−2 sequences are organized in the combined sequence so that every even numbered sequence of the remaining sequences are readable in the second, opposite reading direction, whereas the symbols of every odd numbered sequence of the remaining sequences of the N sequences are readable in the first reading direction.

Hence, in this embodiment the symbols of the N−1 first sequences are organized one after each other and with alternating reading directions. The symbols of the last sequence are preferably always readable in the second, opposite direction. In such a case, if the combined sequence comprises an odd number of sequences, the two last sequences will have symbols organized in the second, opposite direction, whereas if N is even the reading direction will alternate for all sequences in the combined sequence.

The above described embodiment can be defined as co-organizing the symbols of the N sequences into the combined sequence so that the symbols of sequence number N, i.e. the last sequence, are readable in the second, opposite reading direction. The symbols of sequence number 2m+1 of the N sequences are readable in said first reading direction. The symbols of sequence number 2n of the N sequences are readable in said second, opposite reading direction.

The parameter m is an integer and $$m \in \left[0, \frac{N-2}{2}\right], \text{ i.e. } m = 0, \ldots, \left\lfloor \frac{N-2}{2} \right\rfloor,$$

where $\lfloor \ldots \rfloor$ denotes the floor function. Integer corresponds, herein, to the natural numbers including zero together with the negatives of the non-zero natural numbers. However, since m is an integer selected from the closed interval $$\left[0, \frac{N-2}{2}\right] m$$

can not be negative. For instance, N=3 gives m=0, N=4 gives m=0, 1, N=5 gives m=0, 1, N=6 gives m=0, 1, 2, and so on. The parameter n is an integer and $$n \in \left[1, \frac{N-1}{2}\right], n = 1, \ldots, \left\lfloor \frac{N-1}{2} \right\rfloor.$$

Thus, N=3 gives n=1, N=4 gives n=1, N=5 gives n=1, 2, N=6 gives n=1, 2, and so on.

The co-organization of the symbols in the N sequences into the combined sequence is preferably conducted so that the sequences are provided in correct order. Thus, sequence number i precedes sequence number i+1 in the combined sequence, where i=1, 2, . . . , N−1.

In the above presented embodiments, the symbols of the first and last sequence in the combined sequence can be read and decoded in parallel from the combined sequence. However, the respective ends of the first and last sequences and therefore the start positions in the combined sequence of other sequences are not known without the provision of any additional information.

In an embodiment, no such additional information is provided. In such a case, in a first round the first and last sequences can be read and decoded. The decoding then needs at least one additional round in order to read and decode further sequences. However, in such a case the second sequence is arranged in the same first reading direction as the first sequence and the second last sequence is provided in the second, opposite reading direction as the last sequence. Correspondingly, if the combined sequence comprises three sequences of symbols, the first three are preferably arranged in the first reading direction, whereas the last three are preferably arranged in the second, opposite reading direction. In such a case, three decoding rounds are needed in order to decode all sequences in the combined sequence.

In an alternative embodiment, at least one pointer is provided as additional information to facilitate reading and decoding of also intermediate sequences in the combined sequence during the first round. This embodiment is illustrated in more detail in FIG. 6. The method then continues from step S2 in FIG. 1. A next step S30 determines at least one pointer that defines the most significant symbol of an intermediate sequence in the combined sequence. Step S30 determines one or more such pointers, where each pointer then defines the most significant symbol of respective intermediate sequences. The actual number of pointers determined in step S30 depends on the parameter N, i.e. the total number of sequences in the combined sequence. If N is an odd number, step S30 preferably involves determining $$\frac{N-1}{2}$$

pointers, i.e. one pointer for N=3, two pointers for N=5, and so on. Correspondingly, if N is even step S30 preferably determines $$\frac{N}{2} - 1$$

pointers, i.e. one pointer for N=4, two pointers for N=6, and so on. Pointer number k of the $$\frac{N-1}{2} \text{ or } \frac{N}{2} - 1$$

pointers then defines the most significant symbol position of sequence number 2k in the combined sequence. This means that the first pointer identifies the most significant symbol and thereby the start of sequence number 2 in the combined sequence, the second pointer identifies the most significant symbol of sequence number 4, and so on. The parameter k is an integer and $$k \in \left[1, \frac{N-1}{2}\right]$$

if N is odd and $$k \in \left[1, \frac{N}{2} - 1\right]$$

if N is even.

FIGS. 7A to 7D illustrate combined sequences 70 with N=3-6. In FIG. 7A the combined sequence 70 comprises three sequences of symbols 10, 20, 30. The symbols of the first sequence 10 are readable in the first reading direction, whereas the symbols of the second sequence 20 and the last sequence 30 are readable in the second, opposite reading direction. A pointer 11 is determined for the combined sequence 70 and defines the most significant symbol position of the second sequence 20.

FIG. 7B illustrates the case with four sequences 10, 20, 30, 40 in the combined sequence 70. The first and third sequences 10, 30 have symbols in the first reading direction, whereas the symbols in the second and the last sequence 20, 40 are readable in the second, opposite reading direction. A pointer 11 enables identification of the most significant symbol position of the second sequence 20. The pointer 11 also enables identification of the most significant symbol position of the third sequence 30. Thus, since the second and third sequences 20, 30 are readable in opposite direction the most significant symbol of the third sequence 30 will, in this embodiment, occupy the next symbol position in the combined sequence 70 after the most significant symbol of the second sequence 20. This means that if the pointer 11 points towards symbol position $S_1$ in the combined sequence 70 (according to the first reading direction), the most significant symbol of the third sequence 30 will occupy symbol position $S_1+1$. The pointer 11 therefore enables identification of the start of both the second sequence 20 and the third sequence 30 in this example. Alternatively, the pointer 11 points towards the symbol position $S_1$ in the combined sequence 70 corresponding to the most significant symbol of the third sequence 30. The starting position for the second sequence 20 will then be the preceding symbol position $S_1-1$ in the combined sequence 70 according to the reading direction.

FIG. 7C has one additional sequence 50 as compared to FIG. 7B. The symbols of the first sequence 10 and the third sequence 30 are readable in the first reading direction, whereas the second, fourth and last sequences 20, 40, 50 are readable in the second, opposite direction. A first pointer 11 defines the start of the second and third sequences 20, 30 in similarity to the example of FIG. 7B. A second pointer 13 is also determined for the combined sequence 70 in FIG. 7C. The second pointer 13 defines the most significant symbol position of the fourth sequence 40.

In FIG. 7D the first reading direction is employed by the first, third and fifth sequences 10, 30, 50. The symbols in the remaining sequences, i.e. the second, fourth and sixth sequences 20, 40, 60 are readable in the second, opposite reading direction. The first pointer 11 defines the start of the second and third sequences 20, 30 as discussed above. The second pointer 13 not only enables identification of the start of the fourth sequence 40 but also the start of the fifth sequence 50. In such a case, the second pointer 13 preferably defines the most significant symbol position $S_2$ of the fourth sequence 40 within the combined sequence 70. In such a case, the most significant symbol and the start of the fifth sequence 50 is preferably the next symbol position $S_2+1$ in the combined sequence 70 according to the first reading direction.

The determination of one or more pointers 11, 13 for the combined sequences 70 in FIGS. 7A-7D and the particular organization of symbols in different reading directions allow all sequences 10, 20, 30, 40, 50, 60 of the combined sequence 70 to be read and decodable in parallel. The latency at the decoding side will thereby be minimal as a single decoding round can be used with parallel decoders to decode the complete combined sequence 70.

FIGS. 7A-7D also illustrate the result of the variable length encoding, i.e. that not all sequences 10, 20, 30, 40, 50, 60 necessarily have the same size in terms of number of symbols.

As is best seen in FIGS. 7A and 7C the last sequence 30, 50 of the combined sequence 70 must not necessarily be organized in the second, opposite reading direction if pointers 11, 13 are employed. In such a case, the pointer 11 in FIG. 7A and pointer 13 in FIG. 7C could define the start position of the last sequence 30, 50 by pointing towards the symbol position preceding the symbol position of the most significant symbol of the last sequence 30, 50.

However, it is generally preferred to always have the last sequence according to the second, opposite direction since then the decoding side could be preconfigured to always retrieve the last sequence by reading in the second, opposite direction and not only for combined sequences with even N. Additionally, having the last sequence in the second, opposite direction implies that at least two sequences of symbols can be read from the combined sequence even if no pointers are employed.

In an embodiment of step S30, the pointer(s) is(are) determined to have a value corresponding to the symbol position of the most significant symbol of sequence number 2k in the combined sequence. For instance, if the length of the combined sequence is at most 3072 bits, the pointer could be a 12 bit number. However, the size of the pointers can be reduced by using the fact that pointers are not independent. Thus, the symbol position of the second and further pointers cannot be smaller than the bit position of the first pointer and previous pointers. In an alternative embodiment, the pointers are not necessarily equal to the absolute positions in the combined sequence, but rather the symbol position relative to the previous pointer.

In such a case, the first pointer is determined in step S30 to be equal to the symbol position of the most significant symbol of the second sequence. Step S30 further involves determining pointer number j+1 to be equal to a difference between the symbol position of the most significant symbol of sequence number 2j+2 and the symbol position of the most significant symbol of sequence number 2j in the combined sequence. This means that the second pointer 13 will be equal to the difference in symbol positions of the most significant symbols of the fourth and second sequences 20, 40 in the combined sequence 70, see FIGS. 7C and 7D. The parameter where j is an integer and $$j \in \left[1, \frac{N-2}{2}\right] \text{ with } \frac{N-1}{2} \geq 2$$

if N is odd and $$j \in \left[1, \frac{N-1}{2} - 1\right] \text{ with } \frac{N}{2} - 1 \geq 2$$

if N is even.

In this embodiment, the length of the second and further pointers in terms of number of bits or symbols can be reduced as compared to independently determining each pointer.

The at least one pointer determined in step S30 is then stored in a memory in step S31. This memory is advantageously the on-chip memory in a graphical processing unit and is preferably the same memory into which the combined sequence is stored. The storage of the pointer(s) in the memory in step S31 is performed in such a way that it is possible to identify to which combined sequence the pointer(s) belong(s) if the memory can contain more than one combined sequence.

In an alternative or additional embodiment, the size of the pointers can be reduced further by restricting the pointers to be limited to point towards certain symbol positions. For instance, by forcing the pointers of a combined sequence to only point towards even symbol positions or only point towards odd symbol positions in the combined sequence, the length of the pointers can be reduced. This is possible by the usage of so-called padding symbols that are added to the combined sequence to move the start position of at least one of the sequences. This can be extended even further to limit the pointers to only be able to point to symbol positions and addresses that can be divided by four, eight, or some other fixed number.

FIG. 8 is a flow diagram illustrating this concept. The method continues from step S2 in FIG. 1. A next step S40 adds at least one padding symbol to the combined sequence.

```
A.......B.......C................D............................E
00000xaaaa11111xbb2222cccc33333xxxxxxxxxxxxxxxxxxxxxxxxxxxxxddddd
         ^         ^    ^
```

Step S40 preferably involves adding the at least one padding symbol between a least significant symbol of sequence number 2k−1 and sequence number 2k in the combined sequence. The at least one padding symbol thereby forces the symbol position of the most significant symbol of sequence number 2k to be at an even symbol position or at an odd symbol position in the combined sequence unless already being at an even or odd symbol position. Thus, if the pointers are determined to only start at even (or odd) symbol positions, the symbol positions of the most significant symbols in sequence numbers 2k in the combined sequence are investigated, i.e. the second, fourth, and so on. If the symbol position is even (or odd) no padding symbol is added. However, if the symbol position instead would be odd (or even) at least one padding symbol is added between the least significant symbols of the present sequence number 2k and the previous sequence 2k−1 in the combined sequence. The padding symbol will thereby move the symbol position for the most significant symbol and thereby the position of the pointer to an even (or odd) symbol position.

FIG. 9 schematically illustrates this concept. In FIG. 9 padding symbols 21 have been added between the least significant symbols of the first and second sequences 10, 20 to thereby move the start of the second sequence 20 and thereby the symbol position of the first pointer 11 to a desired symbol position. Correspondingly, padding symbols 23 have been added between the least significant symbols of the third and fourth sequences 30, 40 to move the start position of the fourth sequence 40 and the symbol position of the second pointer 13.

The padding symbols do not only have to be used in order to move the positions of the pointers in the combined sequence. Padding symbols can also be added to the combined sequence to get a total size of the combined sequence, including the padding symbols, that correctly matches a desired symbol length for efficient burst transfer. For instance, if the optimal length of a combined sequence from burst transfer point of view is 512 symbols, padding symbols can be added to the combined sequence to reach this target length if the variable length encoding of the blocks resulted in a short length for the combined symbols of the encoded blocks. These padding symbols could then all be added in a continuous sequence, for instance, between the last sequence and the second last sequence in the combined sequence. Alternatively, the padding symbols can be distributed at multiple positions in the combined sequence between consecutive sequences. The insertion of extra padding symbols could then be conducted in such a way that the symbol positions for any pointers get on positions that are easily representable in an efficient way. For instance, padding symbols could be added to move the pointer positions close to predefined symbol positions. This concept is illustrated below.

In the sequence above, A represents symbol position 0, B represents symbol position 8, C represents symbol position 16, D represents symbol position 32 and E is symbol position 63. The figures represents the symbols of the first, third, fifth and seven sequence and the letters represents the symbols of the second, fourth, sixth and eight sequence. x represents padding symbols and ^ indicates the symbol position of the pointers.

In this illustrative example, padding symbols have been added to force the pointers to point to odd symbol positions. In addition, padding symbols have been added between the seventh and eight sequence to reach an optimal length of, in this example, 64 symbols. However, if the extra padding symbols are distributed differently, the pointers could be moved closer to the symbol positions B, C and D:

```
A.......B.......C................D............................E
00000aaaa11111xbb2222xxxxxxxxcccc33333xxxxxxxxxxxxxxxxxxxxxddddd
         ^        ^              ^
```

In this case, the padding symbols have been added between sequences so that the pointers are close to the symbol positions B, C, D, i.e. 8, 16 and 32. It could then be more efficient to define the pointers in relation to these or some other defined symbol positions. Thus, each pointer then represents the difference in symbol length between the most significant symbol of, in this example, the second, fourth or sixth sequence and the defined symbol position 8, 16 or 32. Instead of requiring 6 bits for representing pointers, this approach could, with the help of padding symbols, reduce the pointers to be shorter than 6 bits by instead representing a position difference.

With reference anew to FIG. 3, step S10 involves transmitting the combined sequence over the data bus from the memory in the graphical unit to the buffer memory in the display unit. Step S10 also involves, in this embodiment, transmitting the pointer(s) determined for the combined sequence over the data bus from the memory in the graphical unit to a memory in or connected to the display unit. This memory could be the buffer memory or another memory.

In an alternative embodiment, the co-organization of the symbols of the at least two sequences is conducted similar to a multiplexing or interleaving technique. This embodiment organizes the symbols so that all symbols of one of the first and second sequence are readable in the first reading direction, whereas a first portion of the symbols in the other of the first and second sequence is readable in the first reading direction with a second, remaining portion of the symbols readable in the second, opposite reading direction. The sequence that has symbols readable in both reading directions then comprises more symbols than the other sequence.

For instance, assume that the second symbol sequence comprises more symbols than the first sequence. The co-organization of the symbols then comprises co-organization of the symbols in the first and second sequences into the combined sequence of symbols so that symbols of the first sequence occupy every odd or every even symbol position in a first portion of the combined sequence. A first portion of the symbols of the second sequence then occupy every even or every odd symbol position in the first portion of the combined sequence and also every even or every odd symbol position in a second, remaining portion of the combined sequence. The symbols of the first sequence and the first portion of the symbols in the second sequence are readable in the first reading direction. A second, remaining portion of the symbols in the second sequence occupy every odd or every even symbol position in the second, remaining portion of the combined sequence and is readable in the second, opposite reading direction.

FIG. 10 visually illustrates this concept. In the figure, the symbols of the first sequence 10 are in white, whereas the symbols of the second sequence 20 are marked in hashed. The figure also illustrates the respective reading direction for each symbol. In the illustrated example, the symbols of the first sequence 10 occupy the even symbol positions (0, 2, 4, . . . ) in the first portion 7B of the combined sequence 70. The odd symbol positions (1, 3, 5, . . . ) in this first portion 7B are occupied by the most significant symbols of the second sequence 20. The second sequence 20 also occupies the odd symbol positions in the second, remaining portion 8B of the combined sequence 70. All these symbols, i.e. all symbols of the first sequence 10 and the symbols of the second sequence 20 at odd symbol positions in the combined sequence 70, are readable in the first reading direction. Once the end of the combined sequence 70 is reached, the remaining symbols of the second sequence 20 occupy the even positions in the second, remaining portion 8B of the combined sequence 70. The second sequence 20 is then read by first reading, in the first reading direction, the symbols occupying the odd symbol positions in the combined sequence 70 and then continuing by reading the even symbol positions in the second, remaining portion 8B of the combined sequence 70 but in the second, opposite reading direction.

For example, assume that the first sequence is represented by 012345 and the second sequence is abcdefghij the resulting combined sequence would look like: 0a1b2c3d4e5fjgih. The first sequence is then obtained by reading, in the first reading direction, even symbol positions until the end of the first sequence is reached, i.e. reading symbol positions 0, 2, 4, 6, 8 in the combined sequence. The second sequence is obtained by first reading, in the first reading direction, odd symbol positions until the end of the combined sequence, i.e. reading symbol positions 1, 3, 5, 7, 9, 11, 13, 15. These first symbols of the second sequence are then abcdefgh. The remaining symbols of the second sequence are read from the even symbol positions in the second, opposite reading direction until the end of the second sequence is reached, i.e. reading symbol positions 14, 12, giving the last two symbols ij.

Also in this embodiment both sequences can be read and decoded in parallel.

This embodiment can be combined by arranging sequences in opposite reading direction. In such a case, the combined sequence as illustrated in FIG. 10 is basically complemented with a mirrored interleaved sequence. The combined sequence will then comprise at least four sequences. The first two sequences are interleaved and one of them is solely read in the first reading direction. The other sequence is partly read according to the first reading direction while remaining symbols are read according to the second, opposite reading direction. The remaining two sequences are also interleaved and one of them is solely read in the second, opposite reading direction. The other sequence is partly read in the second, opposite reading direction while remaining symbols are read according to the first reading direction.

An example of such a combined sequence could be 0a1b2c3d4e5fjgihqrpso9n8 m7lk6. The first sequence is then 012345 and the second sequence is abcdefghij as in above. The third sequence is 6789 and the fourth sequence is klmnopqrs.

Decoding

FIG. 11 is a flow diagram illustrating a method of decoding a tile of pixels. The method starts in step S50 where the combined sequence is retrieved from a buffer memory. The combined sequence comprises, as has previously been described, at least a first sequence of symbols as a variable length encoded representation of pixel values of pixels in a first block and a second sequence of symbols as a variable length encoded representation of pixel values of pixels in a second block. The first and second blocks constitute different subsets of the tile.

A next step S51 identifies the first sequence by reading a portion of the retrieved combined sequence in a first reading direction starting from a first defined symbol position in the combined sequence. Step S51 also involves identifying the second sequence by reading a portion of the retrieved combined sequence in a second, opposite reading direction starting from a second defined symbol position in the combined sequence.

The following steps S52 and S53 decode the identified first and second sequences to get decoded representations of the pixel values of the pixels in the first and second blocks. The decoding conducted in steps S52, S53 is basically the inverse of the variable length encoding previously discussed and the references cited herein with regard to variable length encoding schemes also disclose different corresponding decoding schemes that can be employed according to the embodiments.

Step S51 is preferably conducted so that both the first and second sequences are identified and read in parallel from the combined sequence. Furthermore, the decoding step S53 decoding the second sequence is preferably conducted at least partly in parallel with the decoding step S52 decoding the first sequence. In such a case, the total time of identifying the respective sequences and decoding them can be reduced, thereby minimizing decoding latency.

FIG. 12 is a flow diagram illustrating an embodiment of the identifying step in FIG. 11. This embodiment is in particular suitable for a combined sequence as illustrated in FIG. 5. The method continues from step S50 in FIG. 11. A next step S60 identifies the first sequence 10 by reading a first portion 7A of the combined sequence 70 in the first reading direction starting from the most significant symbol position of the combined sequence 70. The variable length encoding is conducted in such a way that by reading symbol position by symbol position of a sequence starting from a defined starting symbol position, it is possible to identify when the end of the sequence is reached. This is an inherent property of the variable length encoding schemes employed by the embodiments. Step S60 therefore involves reading the symbols from the most significant symbol position in the first reading direction towards the least significant symbol and stopping once the end of the first sequence 10 is reached.

Step S61 correspondingly involves identifying the second sequence 20 by reading a second, following portion 8A of the combined sequence 70 in the second, opposite reading direction starting from the least significant symbol of the second, following portion 8A and typically of the combined sequence 70.

The two steps S60 and S61 are preferably performed at least partly in parallel by reading the combined sequence 70 in both reading directions starting from either end of the combined sequence 70. The method then continues to steps S52 and S53, where the identified sequences are decoded.

If the combined sequence comprises N sequences organized as previously described herein, the identification step of FIG. 11 preferably involves identifying the first sequence of the N sequences by reading the combined sequence in the first reading direction starting from the most significant symbol position in the combined sequence. The identification step also comprises identifying the last sequence of the N sequences by reading the combined sequence in the second, opposite reading direction starting from the least significant symbol position of the combined sequence. The remaining sequences in the combined sequence are then identified by reading, for every even numbered sequence of the remaining sequence, the combined sequence in the second, opposite reading direction starting at respective defined symbol positions. The respective odd numbered sequences of the remaining sequences are identified by reading the combined sequence in the first reading direction starting at respective defined symbol positions.

Thus, in this case sequence number N of the N sequences is identified by reading a portion of the combined sequence in the second, opposite reading position starting from the least significant symbol of said combined sequence. Sequence number 2m+1 of the N sequences is identified by reading respective portions of the combined sequence in the first reading direction from respective defined symbol positions. The parameter m is an integer and $$m \in \left[0, \frac{N-2}{2}\right].$$

The identification also involves identifying sequence number 2n of the N sequences by reading respective portions of the combined sequence in the second, opposite reading direction from respective defined symbol positions. The parameter n is an integer and $$n \in \left[1, \frac{N-1}{2}\right].$$

The respective defined symbol positions of the intermediate or remaining sequences in the combined sequence could be obtained following identification of the first and last sequence in a first round. Thus, the next symbol position following, in the first reading direction, the end of the first sequence or following, in the second, opposite reading direction, the end of the last sequence could be the defined symbol position and start symbol for another sequence in the combined sequence. In an alternative approach, at least one pointer is employed to find the defined symbol position(s).

FIG. 13 is a flow diagram illustrating the approach using pointers to identify defined symbol positions for sequences in the combined sequence. The method continues from step S50 in FIG. 11. In an embodiment, step S70 is omitted so the method continues directly to step S71. Step S71 identifies the defined symbol position for a sequence based on a pointer associated with the combined sequence. In a particular embodiment, step S71 comprises identifying the defined symbol position corresponding to the most significant symbol of sequence number 2k and optionally 2k+1 based on a pointer out of $$\frac{N-1}{2}$$

pointers if N is odd and $$\frac{N}{2} - 1$$

pointers if N is even. The pointer then preferably defines the symbol position of the most significant symbol for sequence number 2k of the N sequences. The next symbol position in the first reading direction is then preferably the most significant symbol for the next sequence, i.e. sequence number 2k+1. Thus, each pointer allows identification of the start position for one or two sequences. For instance, in FIG. 7C, the first pointer 11 enables identification of the start positions for both the second sequence 20 and third sequence 30. The second pointer 13, however, only allows identification of the start position for the fourth sequence 40 since the start position of the fifth sequence 50 coincides, in this embodiment, with the least significant symbol of the combined sequence 70. If the N sequences in the combined sequence are all alternating with regard to the reading direction, each pointer will define the respective defines symbol position for two sequences, i.e. sequence number 2k and 2k+1. The parameter k is an integer and $$k \in \left[1, \frac{N-1}{2}\right]$$

if N is odd and $$k \in \left[1, \frac{N}{2} - 1\right]$$

if N is even.

If the sequences are co-organized according to the technique illustrated in FIGS. 7A-7D, each pointer except the last pointer if N is odd allows identification of the defined symbol positions for two sequences in the combined sequence. This therefore happens for all allowable values of the parameter k except when 2k+1=N in which case the pointer only identifies the start position of a single sequence.

The pointer(s) employed in step S71 to identify the defined symbol position(s) could directly define the respective defined symbol position(s). In an alternative approach, pointers are first calculated in step S70 of FIG. 13. In such a case, the defined symbol position of a sequence is advantageously obtained by calculating the sum of a current pointer and all previous pointers for the combined sequence. This preferably applies for all pointers except the first pointer that then directly defines the start position for its associated sequences in the combined sequence.

In a particular embodiment, step S70 therefore comprises calculating the defined symbol position for sequence number 2j+2 and optionally 2j+3 based on a sum of pointer number j+1 and pointer number j. The parameter j is an integer and $$j \in \left[1, \frac{N-3}{2}\right]$$

if N is odd and $$j \in \left[1, \frac{N}{2} - 2\right]$$

if N is even. In this case, N≥5 since for smaller values of the parameter N only a single pointer is needed.

In an alternative embodiment, the combined sequence 70 is organized as illustrated in FIG. 10. In such a case, the identification step in FIG. 11 comprises identifying the first sequence 10 by reading, in the first reading direction, one of every odd and even symbol position in a first portion 7B of the combined sequence 70. The second sequence 20 is identified by reading, in the first reading direction, the other of every odd or even symbol position in the combined sequence 70, i.e. both the first portion 7B and a second, remaining portion 8B. Furthermore, once the end of the combined sequence 70 is reached the reading continues by reading, in the second, opposite reading direction, the one of every odd and even symbol position in the second, remaining portion of the combined sequence.

It is also possible to use a combined sequence with interleaved sequences provided to be read according to both reading directions. Thus, a first and a second sequence are read from the first reading direction with the last symbol(s) of the second sequence read from the second, opposite reading direction. A third and a fourth sequence are instead read from the second, opposite reading direction with the last symbol(s) of the fourth sequence read from the first reading direction as discussed in the foregoing.

Implementation Aspects

Figure 14:
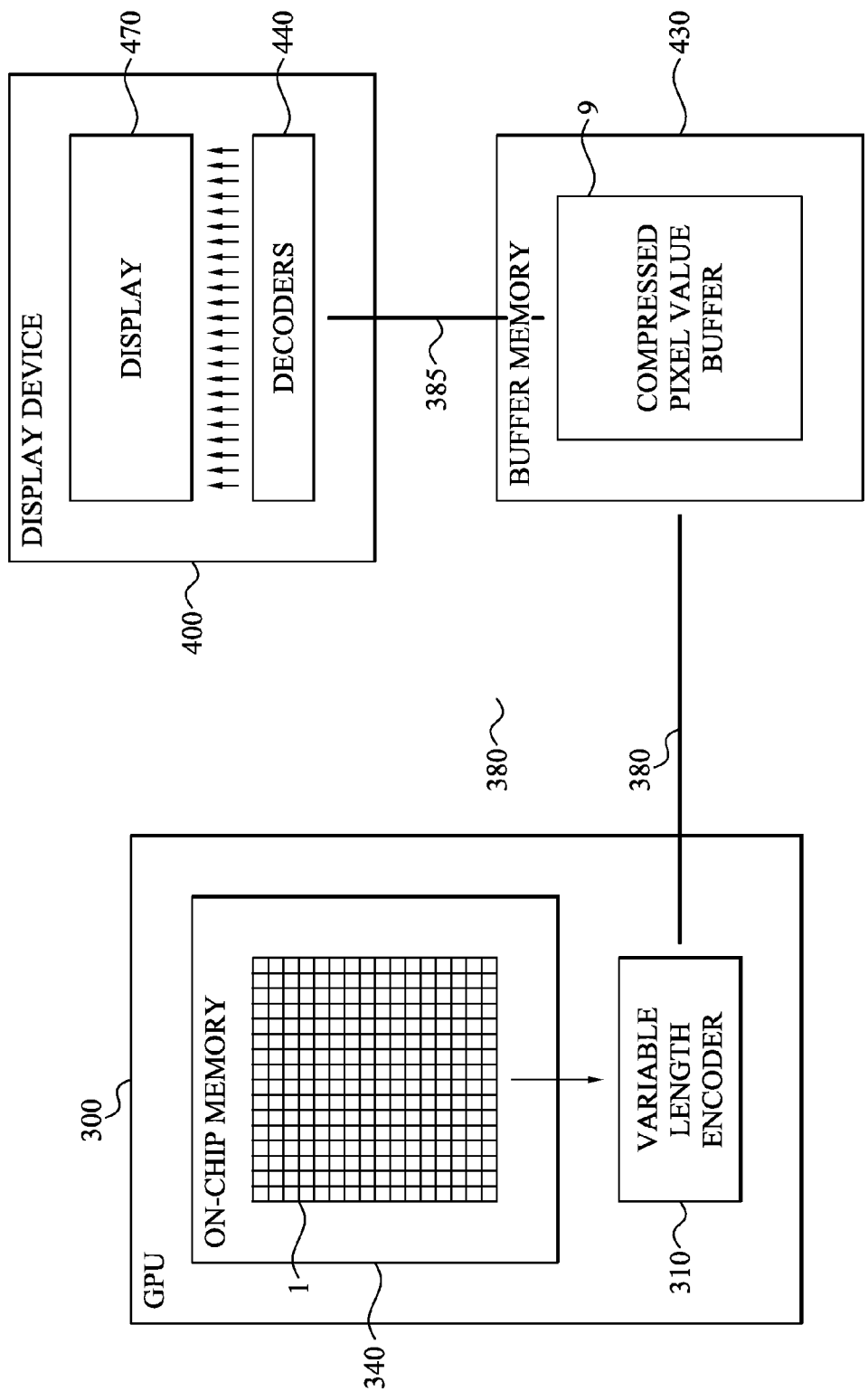
FIG. 14 is a schematic overview of a system for displaying images according to an embodiment.

FIG. 14 is an overview of a graphics system according to an embodiment. The graphics system comprises three main units or entities: a graphical processing unit 300, denoted GPU in the figure, the buffer memory 430 and a display device 400 interconnected via data buses 380, 385. The graphics system can be implemented in any data processing unit or terminal. Non-limiting examples include computers, including laptops, game consoles, mobile telephones and other mobile processing units, such as personal digital assistants, iPad and other tablet computers.

The graphical processing unit 300 comprises an on-chip memory 340 configured to store a tile 1 as it is being encoded by a variable length encoder 310. The resulting respective combined sequences are transferred from the on-chip memory 340 over the data bus 380 to a buffer memory 430. The buffer memory 430 then comprises a pixel value buffer 9 provided in encoded and compressed form. When displaying data on a display 470 of the display device 400 or connected to the display device 400, encoded data corresponding to at least a part of the compressed pixel value buffer 9 is read from the buffer memory 430 and provided to a set of parallel decoders 440 over a data bus 385. The decoders 440 then decode the fetched encoded data in order to get pixel values that can be displayed on the display 470.

In alternative implementation embodiments, a single data bus is employed to transfer data from the GPU 300 to the buffer memory 430 and from the buffer memory 430 to the display device 400. It could also be possible to arrange the buffer memory 430 as a part of the display device 400.

In a particular embodiment, the GPU 300 variable length encodes and compresses all blocks in a chunk. The sum of all symbols, typically bits, required for representing the block, optionally including any pointer bits and any padding bits, define the total size of the chunk. For instance, assume eight 4×4 blocks in a chunk. An uncompressed chunk will then have a size of 4×4×8×3=3072 bits in the case of a RGB888 color buffer. If the compression can reduce the size down to 66%, 33% or ⅙ the corresponding total size will be 2048 bits, 1024 bits or 512 bits. This can be signaled using two size bits $00_{bin}$ to $11_{bin}$. During the encoding of a tile 1, these size bits for the chunk are stored in the GPU 300 in the on-chip memory 340. Once the complete tile 1 has been encoded, it is send from the GPU 300 over the data bus 380 to the buffer memory 430. The size bits are also transferred to another memory area, such as size memory, preferably in the display device 400 or in another part of the buffer memory 430. The size bits are then preferably stored after each other in the size memory starting with all chunks in the first tile 1, then all size bits for the second tile and so on.

When the display device 400 is about to read data from the buffer memory 430 it first reads the relevant size bits in order to determine how much data that should be burst in from the buffer memory 430. For instance, size bits of $01_{bin}$ could represent bursting in 2048 bits for a current chunk. Not all of these 2048 bits must necessary be used and decoded by the decoders 440 in the display device 400.

The GPU 300 must not necessarily transfer all size bits to the size memory after encoding a tile. It could be possible to store a number of size bits in the on-chip memory 340 until the total size of these stored size bits fit well the desired burst size for efficient transfer over the data bus 380, 385.

The size bits could instead be sent directly to the decoders 440 in the display device 400. The decoders 440 then comprise or are connected to an on-chip memory sufficiently large to store all size bits for all tiles to be displayed on the display 470.

Encoder

FIG. 15 is a schematic block diagram of device 100 for encoding a tile according to an embodiment. The device 100 comprises a variable length encoder 110 configured to variable length encode at least a first block of pixels and a second block of pixels to form a first sequence of symbols and a second sequence of symbols. The device 100 could comprise a single variable length encoder 110 that operates serially on the pixel values of the at least first and second blocks. Alternatively, the device 100 comprises a set of multiple variable length encoders 110 that can operate in parallel on pixel data from different blocks in the tile.

A symbol organizer 120 is implemented in the device 100 and is configured to co-organize the symbols of the first and second sequences from the variable length encoder 110 into a combined sequence of symbols. The symbol organizer 120 is then configured to co-organize the symbols so that the symbols of the first sequence are readable in the first reading direction, whereas at least a portion of the symbols in the second sequence are readable in the second, opposite reading direction. The combined sequence generated by the symbol organizer 120 is stored in a memory 140 of the device 100 by a memory controller 130 configured to write data to the memory 140 and read data from the memory 140.

The device 100 preferably comprises an output unit 150, illustrated as a common input and output (I/O) unit 150 in the figure. The output unit 150 is then configured to transmit or transfer the combined sequence from the memory 140 over the data bus illustrated in FIG. 14 and to the buffer memory. The I/O unit 150 preferably comprises one or more I/O ports that interconnect the I/O unit 150 with the data bus.

In a particular embodiment, the symbol organizer 120 is configured to organize the symbols of the first sequence in the first reading direction in a first portion of the combined sequence. The symbol organizer 120 also organizes the symbols of the second sequence in the second, opposite reading direction in a second, following portion of the combined sequence.

The variable length encoder 110 encodes, in an embodiment, more than two blocks of pixels, i.e. variable length encodes N blocks of the tile to form N sequences of symbols as encoded representations of pixel values of the N blocks, where N is an integer equal to or larger than three. The symbol organizer 120 is preferably configured, in this embodiment, to co-organize the symbols of the N sequences into the combined sequence so that the symbols of sequence number N, i.e. the last sequence, are readable in the second, opposite reading direction. The symbol organizer 120 further organizes the symbols of sequence number 2m+1 of the N sequences to be readable in the first reading direction and organizes the symbols of sequence number 2n of the N sequences to be readable in said second, opposite reading direction. The parameters m, n are as previously defined. In addition, the symbol organizer 120 preferably organizes the sequences in increasing order. Thus the symbol organizer 120 provides the N sequences in the combined sequence so that sequence number i precedes sequence number i+1 in the combined sequence, where i=1, 2, . . . , N−1.

In an optional embodiment, the device 100 comprises a pointer generator 160 configured to determine at least one pointer allowing identification of the start position of at least one sequence in the combined sequence. The point generator 160 is preferably configured to determine $$\frac{N-1}{2}$$

pointers if N is odd and $$\frac{N}{2}-1$$

pointers if N is even. The point generator 160 then determines the at least one pointer so that pointer number k defines the symbol position of a most significant symbol of sequence number 2k in the combined sequence. The parameter k is as previously defined. The memory controller 130 then preferably stores the determined pointer(s) in the memory 140 together with the combined sequence. In addition, the output unit 150 also transmits the pointers over the data bus from the memory 140 to a memory, such as in the display unit, in addition to transmitting the combined sequence over the data bus to the buffer memory.

In an embodiment, the pointer generator 160 determines the pointers to represent respective symbol positions in the combined sequence corresponding to the most significant symbol of the respective sequence number 2k. In an alternative embodiment, the pointer generator 160 determines at least one pointer to be equal to the difference in symbol position of the most significant symbol of one of the respective sequences and a preceding respective sequence in the combined sequence. The pointer generator 160 is then preferably configured to determine pointer number j+1 to be equal to a difference between the symbol position of the most significant symbol of sequence number 2j+2 and the symbol position of the most significant symbol of sequence number 2j in the combined sequence. The parameter j is as previously defined.

An optional padding provider 170 can be implemented in the device 100 for adding at least one padding symbol to the combined sequence. The padding provider 170 can then be configured to add at least one padding symbol between the least significant symbols of sequence number 2k−1 and of sequence number 2k in order to force the most significant symbol of sequence number 2k to be at a defined symbol position in the combined sequence unless already being at the defined symbol position. Thus, the padding provider 170 thereby can use padding symbols to move the most significant symbol of sequence number 2k and thereby the pointer associated with this most significant symbol to a defined symbol position that is easily representable by the pointer in an efficient way, i.e. requiring few symbols or bits for the pointer. In a particular embodiment, the padding provider 170 adds padding symbols to force all symbol positions which the pointers define to be at even symbol positions or at odd symbol positions.

In addition or alternatively, the padding provider 170 can add at least one padding symbol to the combined sequence in order to reach a target length of the combined sequence in terms of the number of symbols. The resulting target length could then be adapted for efficient burst transfer over the data bus.

The device 100 does not necessarily have to organize the sequences one after each other in the combined sequence. In an alternative approach, the symbol organizer 120 is configured to co-organize the symbols of the at least first and second sequences into the combined sequence so that the symbols of, for instance, the first sequence occupy every odd (or even) symbol position in a first portion of the combined sequence. The symbol organizer 120 additionally organizes a first portion of the symbols in the second sequence to occupy every even (or odd) symbol position in the combined sequence, i.e. both in the first portion and in a second, remaining portion of the combined sequence. The symbols of the first sequence and the first portion of the symbols in the second sequence are then readable in the first or default reading direction. A second, remaining portion of the symbols in the second sequence are instead organized by the symbol organizer 120 to occupy the odd (or even) symbol positions in the second, remaining portion of the combined sequence. This second, remaining portion of the symbols in the second sequence is readable in the second, opposite reading direction. This concept can be extended to the case with four or more sequences as previously described.

The units 110-130, 140-170 of the device 100 may be implemented or provided as hardware or a combination of hardware and software. In the case of a software-based implementation, a computer program product implementing the device 100 or a part thereof comprises software or a computer program run on a general purpose or specially adapted computer, processor or microprocessor. The software includes computer program code elements or software code portions illustrated in FIG. 15. The program may be stored in whole or part, on or in one or more suitable volatile computer readable media or data storage means, such as RAM, or one or more non-volatile computer readable media or data storage means, such as magnetic disks, CD-ROMs, DVD disks, hard discs, in ROM or flash memory. The data storage means can be a local data storage means or is remotely provided, such as in a data server.

The units 110-170 of the device 100 are preferably implemented in a graphical processing unit as illustrated in FIG. 14 and can be present on a graphics chip. In such a case, the units 110-170 are advantageously implemented in hardware.

Decoder

FIG. 16 is a schematic block diagram of a device 200 for decoding a tile of pixels. The device 200 is connected, over a data bus, to or comprises a buffer memory configured to store a tile in encoded form, where the tile constitutes at least a portion of the pixel value buffer stored in the buffer memory.

A sequence retriever 210 of the device 200 is configured to retrieve a combined sequence of symbols from the buffer memory over the data bus, optionally by means of an input unit 270, represented as a general I/O unit 270 in the figure. The I/O unit 270 preferably comprises one or more I/O ports that interconnect the I/O unit 270 with the data bus. The read combined sequence is typically entered in a memory 230 of the device 200. The combined sequence comprises at least a first and second sequence of symbols as variable length encoded representations of pixel values in a first and second block of pixels, respectively. These first and second blocks constitute different subsets or portions of the tile.

In an optional approach, the sequence retriever 210 first reads size bits or indications from the memory 230 or some other size memory in order to determine the maximum size of the combined sequence and how many symbols that should be read from the buffer memory.

A sequence identifier 220 is implemented in the device 200 to identify the first sequence by reading the combined sequence retrieved by the sequence retriever 210 in a first reading direction starting from a first defined symbol position in the combined sequence. The sequence identifier 220 also identifies the second sequence by reading at least a portion of the retrieved combined sequence in a second, opposite reading direction starting from a second defined symbol position in the combined sequence.

The device 200 also comprises a set of at least two decoders 240, 250 configured to process and decode respective sequences of symbols identified by the sequence identifier 220. By having multiple decoders 240, 250, the device 200 can decode multiple sequences in parallel thereby speeding up the total decoding time and reduce the decoding latency.

A first decoder 240 is then configured to decode the first sequence identified by the sequence identifier 220 to get decoded representations of the pixel values of the pixels in the first block. A second decoder 250 is correspondingly arranged to decode the identified second sequence to get decoded representations of the pixel values of the pixels in the second block. The first and second decoders 240, 250 are preferably configured to operate at least partly in parallel so that the second decoder 250 decodes the second sequence at least partly in parallel with the first decoder 240 decoding the first identified sequence.

In an embodiment, the sequence identifier 220 is configured to identify the first sequence by reading a first portion of the combined sequence in the first reading direction starting from the most significant symbol of the combined sequence. The sequence identifier 220 also identifies, preferably in parallel with the identification of the first sequence, the second sequence from the combined sequence. The second sequence is identified by reading a second, following portion of the combined sequence in the second, opposite reading direction starting from the least significant symbol position of the second, following portion and typically of the combined sequence.

If the combined sequence comprises more than two sequences, i.e. N sequences, where N is an integer equal to or larger than three, the sequence identifier 220 preferably identifies the last sequence, i.e. sequence number N of the N sequences by reading a portion of the combined sequence in the second, opposite reading position Starting from the least significant symbol of the combined sequence. The sequence identifier 220 also identifies sequence number 2m+1 of the N sequences by reading respective portions of the combined sequence in the first reading direction from respective defined symbol positions. The remaining sequences, i.e. sequence number 2n of the N sequences are identified by the sequence identifier 220 by reading respective portions of the combined sequence in the second, opposite reading direction from respective defined symbol positions. The parameters m, n are as previously defined. The device 200 then preferably comprises N decoders 240, 250. Each of these decoders 240, 250 is configured to decode a respective sequence identified by the sequence identifier to get decoded representations of pixel values of pixels in the respective blocks out of N blocks in the tile. Alternatively, the device 200 comprises the first and second decoders 240, 250 that, in a first decoding round, decodes sequence number 1 and sequence number N in the combined sequence, decode sequence number 2 and sequence number N−1 in a second round, and so on.

In a particular embodiment, the sequence identifier 220 is configured to identify the defined symbol position, i.e. start position, for at least one of the sequences in the combined sequence based on at least on pointer associated with the combined sequence and stored in the buffer memory or in another memory 230 of or connected to the device 200. In such a case, the sequence identifier 230 is configured to identify the defined symbol position for sequence number 2k and optionally 2k+1 based on a pointer out of $$\frac{N-1}{2}$$

pointers if N is odd and $$\frac{N}{2}-1$$

pointers it N is even. The parameter k is as previously defined.

The pointer(s) associated with the combined sequence could be used directly as retrieved from the memory 230 by the sequence identifier 220. In an alternative embodiment, the actual value of a pointer first needs to be calculated by a calculator 260 of the device 200. The calculator 260 is then configured to calculate the defined symbol position for sequence number 2j+2 and optionally 2j+3 based on a sum of pointer number j+1 and pointer number j. The parameter j is as previously defined. Thus, the defined symbol position of a given pointer is then preferably obtained by summing the value of the given pointer with the values of previous pointers in the first reading direction for the combined sequence. This approach implies that the length in terms of number of symbols spent on a pointer can be reduced as compared to not using any pointer addition.

In an alternative embodiment, the first and second sequences are organized into the combined sequence as illustrated in FIG. 10. The sequence identifier 220 is then configured to identify the first sequence by reading every odd (or even) symbol position in the first reading direction in a first portion of the combined sequence. The sequence identifier 220 also identifies the second sequence by reading every even (or odd) symbol position in the first reading direction in the first portion and in a second, remaining portion of the combined sequence. These read symbols correspond to a first portion of the second sequence. A second, remaining portion of the symbols in the second sequence is obtained by the sequence identifier 220 by reading every odd (or even) symbol position in the second, opposite reading direction in the second, remaining portion of the combined sequence.

The units 210, 220, 240-260 of the device 200 may be implemented or provided as hardware or a combination of hardware and software. In the case of a software-based implementation, a computer program product implementing the device 200 or a part thereof comprises software or a computer program run on a general purpose or specially adapted computer, processor or microprocessor. The software includes computer program code elements or software code portions illustrated in FIG. 16. The program may be stored in whole or part, on or in one or more suitable volatile computer readable media or data storage means, such as RAM, or one or more non-volatile computer readable media or data storage means, such as magnetic disks, CD-ROMs, DVD disks, hard discs, in ROM or flash memory. The data storage means can be a local data storage means or is remotely provided, such as in a data server.

The units 210-260 of the device 200 are preferably implemented in a display unit as illustrated in FIG. 14. In a particular embodiment, the units 210-260 are advantageously implemented in hardware.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method of encoding a tile of pixels each having a respective pixel value, said method comprising:
variable length encoding a first block of pixels constituting a first subset of said tile to form a first sequence of symbols as an encoded representation of pixel values of said pixels in said first block and ii) a second block of pixels constituting a second subset of said tile to form a second sequence of symbols as an encoded representation of pixel values of said pixels in said second block;
co-organizing said symbols of said first sequence and said symbols of said second sequence into a combined sequence of symbols in which said symbols of said first sequence are readable in a first reading direction and at least a portion of said symbols of said second sequence are readable in a second, opposite reading direction; and
storing said combined sequence in a memory.

2. The method according to claim 1, further comprising transmitting said combined sequence over a data bus from said memory in a graphical processing unit to a buffer memory.

3. The method according to claim 1, wherein co-organizing said symbols comprises:

organizing said symbols of said first sequence in said first reading direction in a first portion of said combined sequence; and
organizing said symbols of said second sequence in said second, opposite reading direction in a second, following portion of said combined sequence.

4. The method according to claim 1, wherein
variable length encoding comprises variable length encoding N blocks of pixels constituting respective subsets of said tile to form N sequences of symbols as encoded representations of pixel values of said pixels in said N blocks, where N is an integer equal to or larger than three; and
co-organizing said symbols comprises co-organizing said symbols of said N sequences into said combined sequence in which said symbols of sequence number N of said N sequences are readable in said second, opposite reading direction, said symbols of sequence number 2m+1 of said N sequences are readable in said first reading direction, where m is an integer and $$m \in \left[0, \frac{N-2}{2}\right],$$

and said symbols of sequence number 2n of said N sequences are readable in said second, opposite reading direction, where n is an integer and $$n \in \left[1, \frac{N-1}{2}\right].$$

5. The method according to claim 4, wherein co-organizing said symbols further comprises providing said N sequences in said combined sequence so that sequence number i precedes sequence number i+1 in said combined sequence, where i=1, 2, . . . , N−1.

6. The method according to claim 4, further comprising: determining $$\frac{N-1}{2}$$

pointers if N is odd and $$\frac{N}{2} - 1$$

pointers if N is even, wherein pointer number k defines a symbol position of a most significant symbol of sequence number 2k in said combined sequence, where k is an integer and $$k \in \left[1, \frac{N-1}{2}\right]$$

if N is odd and k is an integer and $$k \in \left[1, \frac{N}{2} - 1\right]$$

if N is even; and storing said pointers in said memory.

7. The method according to claim 6, wherein determining said pointers comprises determining pointer number j+1 to be equal to a difference between a symbol position of a most significant symbol of sequence number 2j+2 and a symbol position of a most significant symbol of sequence number 2j in said combined sequence, where j is an integer, $$j \in \left[1, \frac{N-2}{2}\right] \text{ and } \frac{N-1}{2} \geq 2$$

if N is odd and j is an integer, $$j \in \left[1, \frac{N-1}{2} - 1\right] \text{ and } \frac{N}{2} - 1 \geq 2$$

if N is even.

8. The method according to claim 5, further comprising adding at least one padding symbol between a least significant symbol of sequence number 2k−1 and a least significant symbol of said sequence number 2k to force said symbol position of said most significant symbol of said sequence number 2k to be an even symbol position in said combined sequence unless already being an even symbol position.

9. The method according to claim 5, further comprising adding at least one padding symbol between a least significant symbol of sequence number 2k−1 and a least significant symbol of sequence number 2k to force said symbol position of said most significant symbol of said sequence number 2k to be an odd symbol position in said combined sequence unless already being an even symbol position.

10. The method according to claim 5, wherein transmitting said combined sequence comprises:

transmitting said combined sequence over said data bus from said memory in a graphical processing unit to a buffer memory; and transmitting said pointers over said data bus from said memory in said graphical processing unit to a memory in a display unit.

11. The method according to claim 1, wherein said second sequence comprises more symbols than said first sequence and co-organizing said symbols comprises co-organizing said symbols of said first sequence and said symbols of said second sequence into said combined sequence of symbols in which said symbols of said first sequence occupy one of every odd symbol position and every even symbol position in a first portion of said combined sequence and a first portion of said symbols of said second sequence occupy the other of every odd symbol position and every even symbol position in said combined sequence and a second, remaining portion of said symbols of said second sequence occupy said one of every odd symbol position and every even symbol position in a second, remaining portion of said combined sequence, wherein symbols in said first portion and symbols occupying said other of every odd symbol position and every even symbol position in said second, remaining portion are readable in said first reading direction and symbols occupying said one of every odd symbol position and every even symbol position in said second, remaining portion are readable in said second, opposite reading direction.

12. A device for encoding a tile of pixels each having a respective pixel value, said device comprising:

a variable length encoder configured to variable length encode i) a first block of pixels constituting a first subset of said tile to form a first sequence of symbols as an encoded representation of pixel values of said pixels in said first block and ii) a second block of pixels constituting a second subset of said tile to form a second sequence of symbols as an encoded representation of pixel values of said pixels in said second block;

a symbol organizer configured to co-organize said symbols of said first sequence and said symbols of said second sequence into a combined sequence of symbols in which said symbols of said first sequence are readable in a first reading direction and at least a portion of said symbols of said second sequence are readable in a second, opposite reading direction; and a memory controller configured to store said combined sequence in a memory.

13. The device according to claim 12, further comprising an output unit configured to transmit said combined sequence over a data bus from said memory to a buffer memory.

14. The device according to claim 12, wherein said symbol organizer is configured to i) organize said symbols of said first sequence in said first reading direction in a first portion of said combined sequence, and ii) organize said symbols of said second sequence in said second, opposite reading direction in a second, following portion of said combined sequence.

15. The device according to claim 12, wherein said variable length encoder is configured to variable length encode N blocks of pixels constituting respective subsets of said tile to form N sequences of symbols as encoded representations of pixel values of said pixels in said N blocks, where N is an integer equal to or larger than three; and said symbol organizer is configured to co-organize said symbols of said N sequences into said combined sequence in which said symbols of sequence number N of said N sequences are readable in said second, opposite reading direction, said symbols of sequence number 2m+1 of said N sequences are readable in said first reading direction, where m is zero or an integer and $$m \in \left[0, \frac{N-2}{2}\right],$$

said symbols of sequence number 2n of said N sequences are readable in said second, opposite reading direction, where n is an integer and $$n \in \left[1, \frac{N-1}{2}\right].$$

16. The device according to claim 15, wherein said symbol organizer is configured to provide said N sequences in said combined sequence so that sequence number i precedes sequence number i+1 in said combined sequence, where i=1, 2, . . . , N−1.

17. The device according to claim 15, further comprising a pointer generator configured to determine $$\frac{N-1}{2}$$

pointers if N is odd and $$\frac{N}{2} - 1$$

pointers if N is even, wherein pointer number k defines a symbol position of a most significant symbol of sequence number 2k in said combined sequence, where k is an integer and $$k \in \left[1, \frac{N-1}{2}\right]$$

if N is odd and k is an integer and $$k \in \left[1, \frac{N}{2} - 1\right]$$

if N is even, wherein said memory controller is configured to store said pointers in said memory.

18. The device according to claim 17, wherein said pointer generator is configured to determine pointer number j+1 to be equal to a difference between a symbol position of a most significant symbol of sequence number 2j+2 and a symbol position of a most significant symbol of sequence number 2j in said combined sequence, where j is an integer, $$j \in \left[1, \frac{N-2}{2}\right] \text{ and } \frac{N-1}{2} \geq 2$$

if N is odd and j is an integer, $$j \in \left[1, \frac{N-1}{2} - 1\right] \text{ and } \frac{N}{2} - 1 \geq 2$$

if N is even.

19. The device according to claim 16, further comprising a padding provider configured to add at least one padding symbol between a least significant symbol of sequence number 2k−1 and a least significant symbol of said sequence number 2k to force said symbol position of said most significant symbol of said sequence number 2k to be an even symbol position in said combined sequence unless already being an even symbol position.

20. The device according to claim 16, further comprising a padding provider configured to add at least one padding symbol between a least significant symbol of sequence number 2k−1 and a least significant symbol of said sequence number 2k to force said symbol position of said most significant symbol of said sequence number 2k to be an odd symbol position in said combined sequence unless already being an even symbol position.

21. The device according to claim 16, wherein said output unit is configured to i) transmit said combined sequence over a data bus from said memory to a buffer memory and ii) transmit said pointers over said data bus from said memory to a memory in a display unit.

22. The device according to claim 12, wherein said second sequence comprises more symbols than said first sequence and said symbol organizer is configured to co-organize said symbols of said first sequence and said symbols of said second sequence into said combined sequence of symbols in which said symbols of said first sequence occupy one of every odd symbol position and every even symbol position in a first portion of said combined sequence and a first portion of said symbols of said second sequence occupy the other of every odd symbol position and every even symbol position in said combined sequence and a second, remaining portion of said symbols of said second sequence occupy said one of every odd symbol position and every even symbol position in a second, remaining portion of said combined sequence, wherein symbols in said first portion and symbols occupying said other of every odd symbol position and every even symbol position in said second, remaining portion are readable in said first reading direction and symbols occupying said one of every odd symbol position and every even symbol position in said second, remaining portion are readable in said second, opposite reading direction.

23. A method of decoding a tile of pixels each having a respective pixel value, said method comprising:
retrieving a combined sequence of symbols from a buffer memory, said combined sequence comprises a first sequence of symbols as a variable length encoded representation of pixel values of pixels in a first block constituting a first subset of said tile and a second sequence of symbols as a variable length encoded representation of pixel values of pixels in a second block constituting a second subset of said tile;
identifying i) said first sequence by reading a portion of said retrieved combined sequence in a first reading direction starting from a first defined symbol position in said combined sequence and ii) said second sequence by reading a portion of said retrieved combined sequence in a second, opposite reading direction starting from a second defined symbol position in said combined sequence;
decoding said identified first sequence to get decoded representations of said pixel values of said pixels in said first block; and
decoding said identified second sequence to get decoded representations of said pixel values of said pixels in said second block.

24. The method according to claim 23, wherein decoding said identified second sequence is conducted at least partly in parallel with decoding said identified first sequence.

25. The method according to claim 23, wherein identifying said first sequence and said second sequence comprises:
identifying said first sequence by reading a first portion of said combined sequence in said first reading direction starting from a most significant symbol position of said combined sequence; and
identifying said second sequence by reading a second, following portion of said combined sequence in said second, opposite reading direction starting from a least significant symbol position of said second, following portion.

26. The method according to claim 23, wherein said combined sequence comprises N sequences of symbols as variable length encoded representations of pixel values of pixels in N blocks constituting respective subsets of said tile, where N is an integer equal to or larger than three, and wherein identifying said first sequence and said second sequence comprises:
identifying sequence number N of said N sequences by reading a portion of said combined sequence in said second, opposite reading position starting from a least significant symbol of said combined sequence;

identifying sequence number 2m+1 of said N sequences by reading respective portions of said combined sequence in said first reading direction from respective defined symbol positions, where m is an integer and $$m \in \left[0, \frac{N-2}{2}\right];$$

and identifying sequence number 2n of said sequences by reading respective portions of said combined sequence in said second, opposite reading direction from respective defined symbol positions, where n is an integer and $$n \in \left[1, \frac{N-1}{2}\right].$$

27. The method according to claim 26, further comprising identifying said defined symbol position for sequence number 2k and optionally 2k+1 based on a pointer out of $$\frac{N-1}{2}$$

pointers if N is odd and $$\frac{N}{2} - 1$$

pointers if N is even, said pointers being associated with said combined sequence, where k is an integer and $$k \in \left[1, \frac{N-1}{2}\right]$$

if N is odd and k is an integer and $$k \in \left[1, \frac{N}{2} - 1\right]$$

if N is even.

28. The method according to claim 27, further comprising calculating said defined symbol position for sequence number 2j+2 and optionally 2j+3 based on a sum of pointer number j+1 and pointer number j, where j is an integer and $$j \in \left[1, \frac{N-3}{2}\right]$$

if N is odd and j is an integer and $$j \in \left[1, \frac{N}{2} - 2\right]$$

if N is even, N≥5.

29. The method according to claim 23, wherein said second sequence comprises more symbols than said first sequence, and wherein identifying said first sequence and said second sequence comprises:

identifying said first sequence by reading, in said first reading direction, one of every odd symbol position and every even symbol position in a first portion of said combined sequence; and identifying said second sequence by reading, in said first reading direction, the other of every odd symbol position and every even symbol position in said combined sequence and by reading, in said second, opposite reading direction, said one of very odd symbol position and every even symbol position in a second remaining portion of said combined sequence.

30. A device for decoding a tile of pixels each having a respective pixel value, said device comprising:

a sequence retriever configured to retrieve a combined sequence of symbols from a buffer memory, said combined sequence comprises a first sequence of symbols as a variable length encoded representation of pixel values of pixels in a first block constituting a first subset of said tile and a second sequence of symbols as a variable length encoded representation of pixel values of pixels in a second block constituting a second subset of said tile;

a sequence identifier configured to identify i) said first sequence by reading a portion of said retrieved combined sequence in a first reading direction starting from a first defined symbol position in said combined sequence and ii) said second sequence by reading a portion of said retrieved combined sequence in a second, opposite reading direction starting from a second defined symbol position in said combined sequence;

a first decoder configured to decode said identified first sequence to get decoded representations of said pixel values of said pixels in said first block; and a second decoder configured to decode said identified second sequence to get decoded representations of said pixel values of said pixels in said second block.

31. The device according to claim 30, wherein said second decoder is configured to decode said identified second sequence at least partly in parallel with said first decoder decoding said identified first sequence.

32. The device according to claim 30, wherein said sequence identifier is configured to i) identify said first sequence by reading a first portion of said combined sequence in said first reading direction starting from a most significant symbol position of said combined sequence, and ii) identify said second sequence by reading a second, following portion of said combined sequence in said second, opposite reading direction starting from a least significant symbol position of said second, following portion.

33. The device according to claim 30, wherein said combined sequence comprises N sequences of symbols as variable length encoded representations of pixel values of pixels in N blocks constituting respective subsets of said tile, where N is an integer equal to or larger than three, and wherein said sequence identifier is configured to:

i) identify sequence number N of said N sequences by reading a portion of said combined sequence in said second, opposite reading position starting from a least significant symbol of said combined sequence;

ii) identify sequence number 2m+1 of said N sequences by reading respective portions of said combined sequence in said first reading direction from respective defined symbol positions, where m is an integer and $$m \in \left[0, \frac{N-2}{2}\right];$$

and iii) identify sequence number 2n of said N sequences by reading respective portions of said combined sequence in said second, opposite reading direction from respective defined symbol positions, where n is an integer and $$n \in \left[1, \frac{N-1}{2}\right],$$

wherein said device comprises N decoders each being configured to decode a respective identified sequence to get decoded representations of pixel values of pixels in a respective block out of N blocks constituting respective subsets of said tile.

34. The device according to claim 33, wherein said sequence identifier is configured to identify said defined symbol position for sequence number 2k and optionally 2k+1 based on a pointer out of $$\frac{N-1}{2}$$

pointers if N is odd and $$\frac{N}{2} - 1$$

pointers if N is even, said pointers being associated with said combined sequence, where k is an integer and $$k \in \left[1, \frac{N-1}{2}\right]$$

if N is odd and k is an integer and $$k \in \left[1, \frac{N}{2} - 1\right]$$

if N is even.

35. The device according to claim 34, further comprising a calculator configured to calculate said defined symbol position for sequence number 2j+2 and optionally 2j+3 based on a sum of pointer number j+1 and pointer number j, where j is an integer and $$j \in \left[1, \frac{N-3}{2}\right]$$

if N is odd and j is an integer and $$j \in \left[1, \frac{N}{2} - 2\right]$$

if N is even, N≥5.

36. The device according to claim 30, wherein said second sequence comprises more symbols than said first sequence, and wherein said sequence identifier is configured to:

i) identify said first sequence by reading, in said first reading direction, one of every odd symbol position and every even symbol position in a first portion of said combined sequence; and ii) identify said second sequence by reading, in said first reading direction, the other of every odd symbol position and every even symbol position in said combined sequence and by reading, in said second, opposite reading direction, said one of very odd symbol position and every even symbol position in a second remaining portion of said combined sequence.

* * * * *

UNITED STATES PATENT AND TRADEMARK OFFICE
CERTIFICATE OF CORRECTION

PATENT NO.         : 9,014,497 B2
APPLICATION NO.    : 13/994070
DATED              : April 21, 2015
INVENTOR(S)        : Strom et al.

Page 1 of 1

It is certified that error appears in the above-identified patent and that said Letters Patent is hereby corrected as shown below:

On the Title Page, in Item (56), under "OTHER PUBLICATIONS", in Column 2, Line 1, delete ""Error-Resillent" and insert -- "Error-Resilient --, therefor.

IN THE SPECIFICATION

In Column 8, Line 26, delete "sequence will" and insert -- sequence 20 will --, therefor.

In Column 24, Line 35, delete "identifier 230" and insert -- identifier 220 --, therefor.

In Column 24, Line 50, delete "it N" and insert -- if N --, therefor.

Signed and Sealed this
Twenty-third Day of February, 2016

Michelle K. Lee
*Director of the United States Patent and Trademark Office*